(12) United States Patent
Sharifi et al.

(10) Patent No.: US 12,154,561 B2
(45) Date of Patent: Nov. 26, 2024

(54) ACCELEROMETER-BASED ENDPOINTING MEASURE(S) AND /OR GAZE-BASED ENDPOINTING MEASURE(S) FOR SPEECH PROCESSING

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 362 days.

(21) Appl. No.: 17/554,280

(22) Filed: Dec. 17, 2021

(65) Prior Publication Data

US 2023/0197071 A1 Jun. 22, 2023

(51) Int. Cl.
*G10L 15/22* (2006.01)
*G06F 3/01* (2006.01)
(Continued)

(52) U.S. Cl.
CPC .............. *G10L 15/22* (2013.01); *G06F 3/013* (2013.01); *G10L 15/26* (2013.01)

(58) Field of Classification Search
CPC ......... G10L 15/22; G10L 15/26; G10L 15/25; G10L 15/08; G10L 15/00; G10L 15/04; G10L 15/1822; G10L 15/16; G10L 15/063; G10L 15/1815; G10L 25/87; G10L 25/78; G10L 25/93; G10L 2025/932; G10L 2025/935; G06F 3/013; G06F 3/01; G06F 3/015; G06F 3/167; G06F 3/017;
(Continued)

(56) References Cited

U.S. PATENT DOCUMENTS 10,192,546 B1 1/2019 Piersol et al.
10,755,714 B2 8/2020 Kim et al.
(Continued)

FOREIGN PATENT DOCUMENTS

WO 2018208497 A2 11/2018
WO 2020050882 A2 3/2020

OTHER PUBLICATIONS

European Patent Office; International Search Report and Written Opinion issued in Application No. PCT/US2022/046725; 14 pages; dated Jan. 30, 2023.

*Primary Examiner* — Leshui Zhang
(74) *Attorney, Agent, or Firm* — Gray Ice Higdon

(57) ABSTRACT

An overall endpointing measure can be generated based on an audio-based endpointing measure and (1) an accelerometer-based endpointing measure and/or (2) a gaze-based endpointing measure. The overall endpointing measure can be used in determining whether a candidate endpoint is an actual endpoint. Various implementations include generating the audio-based endpointing measure by processing an audio data stream, capturing a spoken utterance of a user, using an audio model. Various implementations additionally or alternatively include generating the accelerometer-based endpointing measure by processing a stream of accelerometer data using an accelerometer model. Various implementations additionally or alternatively include processing an image data stream using a gaze model to generate the gaze-based endpointing measure.

16 Claims, 11 Drawing Sheets

(51) Int. Cl.
G10L 15/25 (2013.01)
G10L 15/26 (2006.01)
G10L 25/87 (2013.01)

(58) Field of Classification Search
CPC ........ G06F 3/0481; G06F 3/011; G06F 40/30; H04W 4/02
USPC ....... 704/255, 256, 257, 260, 261, 266, 267, 704/270, 270.1, 271, 272, 275, 276
See application file for complete search history.

(56) References Cited

U.S. PATENT DOCUMENTS

2017/0365249 A1* 12/2017 Dusan ..................... G10L 15/05
2018/0012596 A1* 1/2018 Piernot ................... G10L 15/26
2020/0349966 A1* 11/2020 Konzelmann ........... G06F 3/167

* cited by examiner

ACCELEROMETER-BASED ENDPOINTING MEASURE(S) AND /OR GAZE-BASED ENDPOINTING MEASURE(S) FOR SPEECH PROCESSING

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). Automated assistants typically rely upon a pipeline of components in interpreting and responding to spoken utterances (or touch/typed input). For example, an automatic speech recognition (ASR) engine can process audio data that correspond to a spoken utterance of a user to generate ASR output, such as speech hypotheses (i.e., sequence of term(s) and/or other token(s)) of the spoken utterance or phoneme(s) that are predicted to correspond to the spoken utterance. Further, a natural language understanding (NLU) engine can process the ASR output (or the touch/typed input) to generate NLU output, such as an intent of the user in providing the spoken utterance (or the touch/typed input) and optionally slot value(s) for parameter(s) associated with the intent. Moreover, a fulfillment engine can be used to process the NLU output, and to generate fulfillment output, such as a structured request to obtain responsive content to the spoken utterance and/or perform an action responsive to the spoken utterance, and a stream of fulfillment data can be generated based on the fulfillment output.

Generally, a dialog session with an automated assistant is initiated by a user providing a spoken utterance, and the automated assistant can respond to the spoken utterance using the aforementioned pipeline of components to generate a response. The user can continue the dialog session by providing an additional spoken utterance, and the automated assistant can respond to the additional spoken utterance using the aforementioned pipeline of components to generate an additional response. Put another way, these dialog sessions are generally turn-based in that the user takes a turn in the dialog session to provide a spoken utterance, and the automated assistant takes a turn in the dialog session to respond to the spoken utterance when the user stops speaking.

An audio-based endpointing measure can be used by the computing system in identifying when the user stops speaking. For example, the system can determine a binary signal indicating whether the user is speaking or not speaking. An example audio-based endpointing measure can indicate a threshold amount of time has passed since the user stopped speaking. For instance, a user can speak the utterance "turn off the kitchen lights". An audio-based endpointing measure can be identified based on a threshold amount of time after the user finishes speaking "turn off the kitchen lights" (e.g., 0.25 seconds, 0.5 seconds, etc.), where the audio-based endpointing measure can indicate the user has finished speaking the spoken utterance.

SUMMARY

Implementations described herein are directed to generating an overall endpointing measure indicating a user has finished speaking a spoken utterance based on an audio-based endpointing measure, an accelerometer-based endpointing measure and/or a gaze-based endpointing measure. In some implementations, the overall endpointing measure can be generated by processing the audio-based endpointing measure, the accelerometer-based endpointing measure, the gaze-based endpointing measure, additional or alternative signals, and/or combinations thereof, using an overall endpointing model. Additionally or alternatively, the overall endpointing measure can be generated based on an audio data stream capturing a spoken utterance, an accelerometer data stream capturing movement of a client device and/or gestures made by the user, and/or an image data stream capturing the gaze of a user. Using the overall endpointing measure (e.g., a combination of the audio-based endpointing measure, the acceleration-based endpointing measure, and/or the gaze-based endpointing measure) can decrease latency perceived by the user between the user finishing speaking a spoken utterance and the computing system performing one or more actions based on the spoken utterance. Additionally or alternatively, using the overall endpointing measure can decrease the likelihood the computing system begins performing action(s) based on a partial spoken utterance before the user has finished speaking.

In some implementations, an audio-based endpointing measure can indicate whether a threshold amount of time has elapsed since a user has stopped speaking (e.g., 0.1 seconds, 0.25 seconds, 0.5 seconds, 1 second, 2 seconds, and/or one or more additional amounts of time have elapsed since the user stopped speaking). However, there can be a trade off in terms of sensitivity when only using an audio-based endpointing measure. If the threshold is set to allow for longer pauses after the user has stopped speaking, latency between the user finishing speaking and the system performing action(s) based on the spoken utterance can increase. Conversely, if the threshold indicates shorter pauses, the system risks cutting off part of the spoken utterance, thus requiring the user to repeat the spoken utterance. In some implementations, the audio-based endpointing measure can be generated by processing an audio data stream captured via one or more microphones of the client device using an audio-based model.

In some implementations, an accelerometer-based endpointing measure can indicate a user has stopped speaking. The accelerometer-based endpointing measure can be generated based on a stream of accelerometer data captured via one or more accelerometers of a client device. For example, the accelerometer data stream can be captured via an accelerometer of a mobile phone, an accelerometer of a smart watch, an accelerometer of a tablet computer, an accelerometer of one or more additional client devices, and/or combinations thereof. In some of those implementations, the accelerometer data stream can be processed using an accelerometer model to classify movement(s) of the client device and/or gesture(s) made by the user of the client device. For example, one or more movements of the client device, that can be classified using the accelerometer model, can include the user moving the client device towards their mouth, moving the client device away from their mouth, taking the client device out of a pocket, picking the client device off a table, moving the client device such that the user can view a display of the client device, squeezing the client device to initiate a dialog session, pressing a physical and/or virtual button to initiate a dialog session, one or more alternative movements and/or gestures, and/or combinations thereof.

Movement(s) of the client device and/or gesture(s) of the user of the client device can indicate the user has finished speaking. For instance, the user moving the client device away from their mouth can indicate the user has finished speaking. Additionally or alternatively, some movement(s) of the client device and/or gesture(s) of the user of the client device can indicate the user has not finished speaking. For instance, the user moving the client device towards their mouth can indicate the user has not finished speaking. Furthermore, some combinations of movement(s) of the client device and/or gesture(s) of the user of the client device can indicate the user has finished speaking. For instance, the combination of the user moving the client device towards their mouth and subsequently moving the client device such that they can see the display of the client device can indicate the user has finished speaking.

In some implementations, a gaze-based endpointing measure can indicate the user has finished speaking based on the gaze of the user. For instance, the gaze-based endpointing measure can indicate the user is looking at a display of the client device waiting for the client device to display content responsive to the spoken utterance. The gaze-based endpointing measure can be determined by processing an image data stream using a gaze model. In some implementations, the image data stream can be captured via one or more cameras of the client device. For instance, the image data stream can be captured via a front facing camera of a mobile phone.

For example, a user can move a mobile phone towards their face before beginning to speak the utterance "show me pictures of the beach". After speaking the utterance, the user may move the mobile phone away from their face and look at the display of the mobile phone to view content responsive to the spoken utterance. In the illustrate example, the audio data stream can capture the user speaking "show me pictures of the beach", the accelerometer data stream can capture the movement of the mobile device towards the user's face and away from the user's face, and the image data stream can capture the user's gaze toward the mobile phone. The audio-based endpointing measure can be generated based on processing the audio data stream capturing "show me pictures of the beach" using an audio-based endpointing model. Additionally or alternatively, the accelerometer-based endpointing measure can be generated based on processing the accelerometer data stream capturing the movement of the mobile phone towards and then away from the user's face using an accelerometer model. Furthermore, the gaze-based endpointing measure can be generated based on processing the image data stream capturing the user's gaze at the mobile phone using a gaze model.

As a further example, the user can move the mobile phone towards their face before beginning to speak the utterance "show me pictures of the beach [PAUSE] in Florida". After speaking the user can move the mobile phone away from their face and look at the display of the mobile phone to view content responsive to the spoken utterance. A system using only an audio-based endpointing measure may incorrectly determine that the user is speaking the utterance "show me pictures of the beach" (i.e., it can determine an actual endpoint after the user has spoken "beach" and before the user has spoken "in Florida"). In contrast, an overall endpointing measure can take into account the positioning of the mobile phone (e.g., based on accelerometer data) after the user says "show me pictures of the beach" and/or the lack of the user's gaze at the display in determining the pause in the user's speech is not an actual endpoint. Furthermore, the system can use accelerometer data from when the user moves the mobile phone to look at the display and/or image data from when the user's gaze is directed at the display in determining the user has finished speaking (i.e., in determining action actual endpoint) after the user says "show me pictures of the beach [PAUSE] in Florida".

Additionally or alternatively, the system can prefetch action(s) based on the audio data stream captured at candidate endpoints. For instance, the user can speak the utterance "show me pictures [PAUSE] of the beach [PAUSE] in Florida". In some implementations, the system can determine candidate audio-based endpoints after the user speaks "show me pictures", "show me pictures of the beach", and "show me pictures of the beach in Florida". In some of those implementations, the system can prefetch content responsive to the spoken utterance at each candidate endpoint. For example, the system can initially prefetch a first set of images based on "show me pictures", the system can then prefetch a second set of images of the beach based on "show me pictures of the beach" (optionally discarding the initially prefetched image(s)), and can then prefetch a second set of images of the beach in Florida based on "show me pictures of the beach in Florida". For example, the first set can include image(s) that do not include a "beach" and are not taken in "Florida" (e.g., a search to identify the first set can not include "beach" or "Florida" as restrictions). However, the second set can be restricted to images that include a "beach", but can include image(s) that are not taken in "Florida". Further, the third set can be restricted to images that include a "beach" and are taken in "Florida". In some implementations, the system can determine whether the candidate endpoint is an endpoint using the overall endpointing measure. In response to determining the endpoint using the overall endpointing measure, the system can perform the prefetched action(s). In the illustrated example, the system can render the prefetched images on the beach in Florida in response to determining the endpoint based on the overall endpointing measure. In some implementations, prefetching responsive content responsive to candidate endpoints, but waiting to render the content based on the overall endpointing measure can further reduce latency between the user completing the spoken utterance and the system providing the responsive content. Put another way, the responsive content can be prefetched responsive to a candidate endpoint to reduce latency in rendering the responsive content if an actual endpoint is determined (e.g., using an overall endpointing measure) before the user provides any more spoken input. However, rendering the responsive content is still contingent on determining the actual endpoint, thereby preventing errant rendering of prefetched responsive content, which can be computationally wasteful and can negatively impact the interaction between the user and the automated assistant.

Accordingly, various implementations set forth techniques for generating an overall endpointing measure for a spoken utterance based on an audio-based endpointing measure, an accelerometer-based endpointing measure and/or a gaze-based endpointing measure. There is a tradeoff when a system uses only an audio-based endpointing measure, where a user encounters higher latency and must wait longer for action(s) following speaking an utterance when there is a longer threshold, and/or the user may have to repeat commands when the system cuts off mid utterance when there is a shorter threshold. In contrast, implementations disclosed herein include determining an overall endpointing measure based on additional signals capturing the movement(s) of the client device and/or the gaze of the user of the client device. Using the accelerometer-based endpointing measure and/or gaze-based endpointing measure can reduce the latency, compared to only using an audio-based endpointer, between the user finishing speaking a spoken utterance and the system performing action(s) based on the spoken utterance. Additionally or alternatively, using the overall endpointing measure can reduce the number of times a user must repeat spoken utterances where the system prematurely determines an endpoint before the user has finished speaking the utterance.

The above description is provided only as an overview of some implementations disclosed herein. These and other implementations of the technology are disclosed in additional detail below. It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
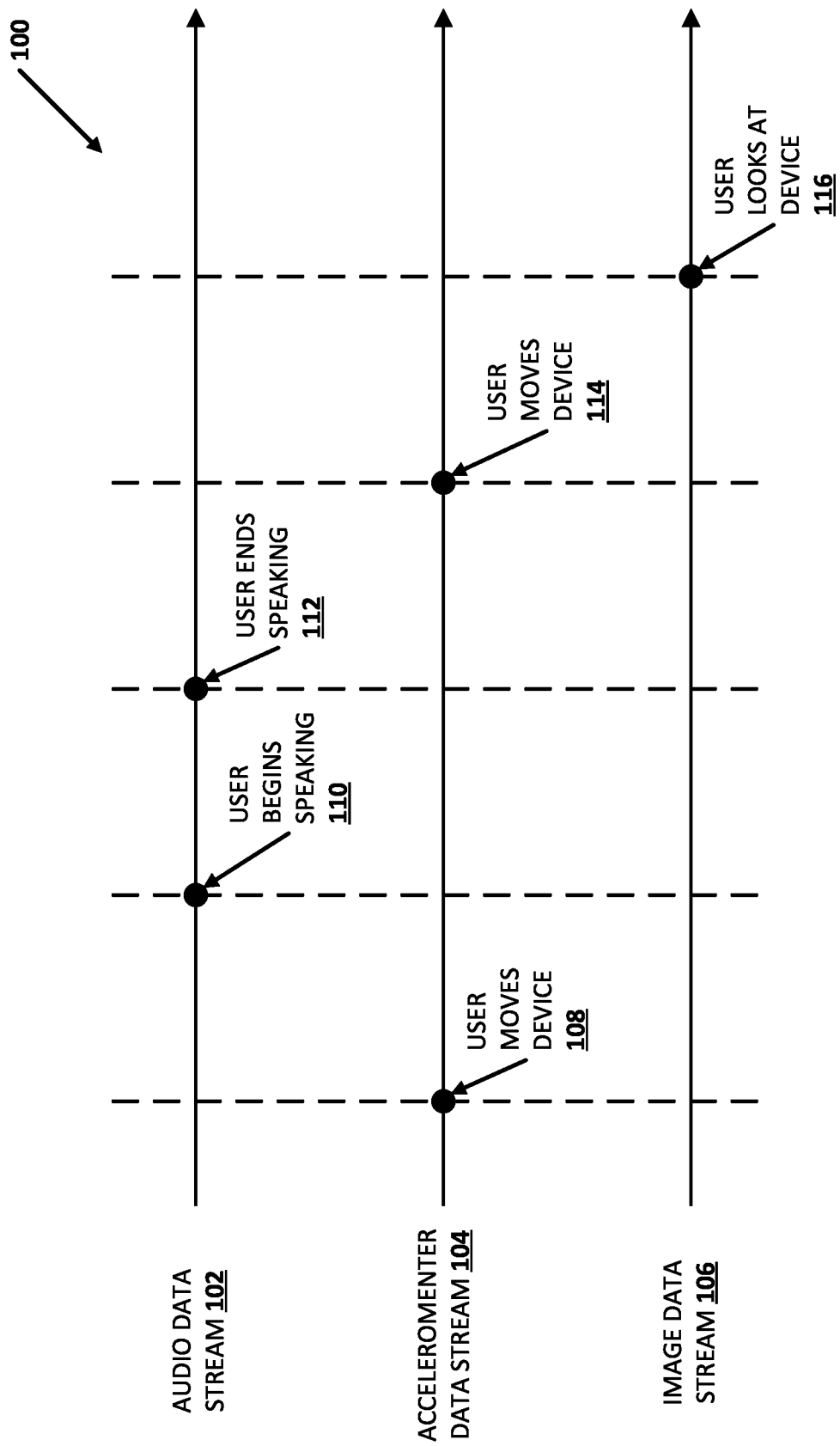
FIG. 1A illustrates an example of an audio data stream, an accelerometer data stream, and an image data stream in accordance with various implementations disclosed herein.

Turning now to the figures, FIG. 1A illustrates an example 100 in accordance with some implementations. Example 100 includes audio data stream 102, accelerometer data stream 104 and image data stream 106. Audio data stream 102 captures a spoken utterance by a user of a client device. In some implementations, the spoken utterance can be captured via one or more microphones of the client device. Accelerometer data stream 104 captures movement of the client device and/or gesture(s) made by the user of the client device. In some implementations, accelerometer data stream 104 can be captured via one or more accelerometers of the client device. Additionally or alternatively, image data stream 106 can capture a gaze of the user of the client device. In some implementations, image data stream 106 can be captured via one or more cameras of the client device, such as a front facing camera of a mobile phone.

In the illustrated example 100, the user moves the client device at point 108. This movement can be captured in accelerometer data stream 104. At point 110, the user begins speaking the spoken utterance. At point 112, the user ends speaking the spoken utterance. At point 114, the user moves the client device an additional time. At point 116, the user looks at the device.

For example, the user may pick up a mobile phone before beginning to speak the utterance at point 108 and may move the mobile phone again at point 114 to view action(s) corresponding to the spoken utterance. The movement at points 108 and 114 can be captured in accelerometer data stream 104. Additionally or alternatively, the user can speak a spoken utterance of "show me videos from my vacation". The user can begin speaking the utterance at point 110 and can finish speaking the utterance at point 112. The user speaking and/or an absence of speech by the user can be captured in audio data stream 102. Furthermore, the user can look at a display on the mobile phone at point 116 to view images of the beach based on the spoken utterance "show me videos from my vacation". The user's gaze at the display of the mobile phone can be captured in image data stream 106.

An overall endpointing measure can be generated based on the audio data stream 102, accelerometer data stream 104, image data stream 106 and/or additional or alternative data. In some implementations, the overall endpointing measure can indicate the user has finished speaking the utterance of "show me videos from my vacation".

Figure 1B:
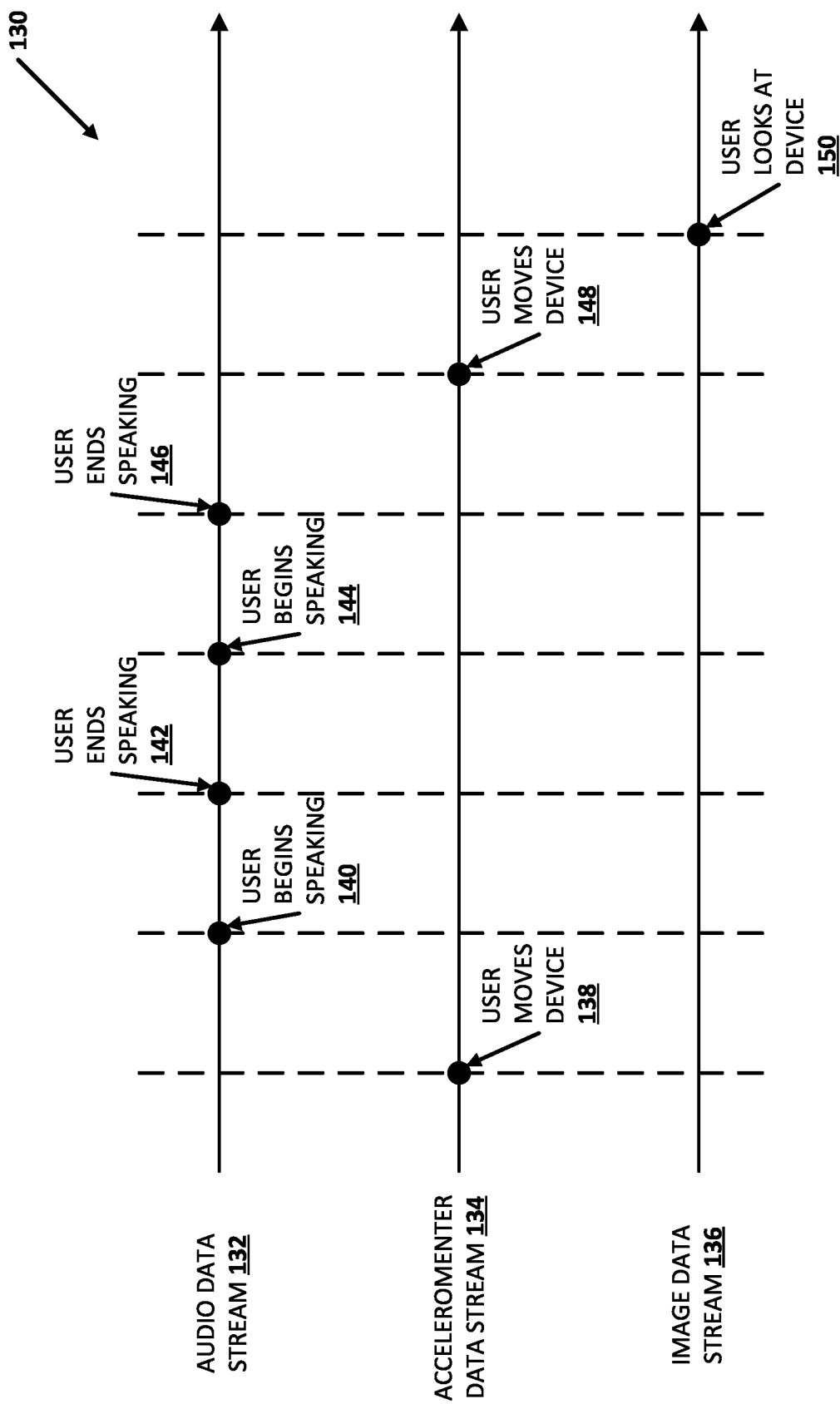
FIG. 1B illustrates another example of an audio data stream, an accelerometer data stream, and an image data stream in accordance with various implementations disclosed herein.

Similarly, FIG. 1B illustrates another example 130 of data streams in accordance with some implementations. Example 130 includes audio data stream 132, accelerometer data stream 134, and image data stream 136. In contrast to example 100, a user can pause while speaking the spoken utterance in example 130. A user can move a client device at point 138. The user can begin speaking a spoken utterance at point 140. The user speaking in example 130 illustrates a pause while speaking the utterance. The pause is indicated by the user ending speech at point 142 and beginning speech again at point 144. Furthermore, the user can complete speaking the spoken utterance at point 146. The user can move the device again at point 148. Additionally or alternatively, the user can look at the device at point 150.

For example, the user can pick up a mobile phone at point 138. The user can begin speaking the spoken utterance of "show me videos from my vacation at the Grand Canyon" at point 140. However, in contrast to example 100, the user can pause while speaking the spoken utterance. As a further example, the user can speak "show me videos from my vacation" beginning at point 140 and ending at point 142. The user can pause speaking the utterance between point 142 and point 144. Furthermore, the user can complete the spoken utterance and speak "at the Grand Canyon" beginning at point 144 and ending at point 146. The user can move the mobile phone to view the display at point 148. Similarly, the user can look at the device to view pictures of the beach at point 150.

A system using only an audio-based endpointing measure may incorrectly determine the pause between point 142 and 144 is an endpoint and perform action(s) based on "show me videos from my vacation". In contrast, by using an overall endpointing measure generated based on the audio-based endpointing measure, the accelerometer-based endpointing measure, and the gaze-based endpointing measure, the system can determine the pause is not a true endpoint and can wait for the user to continue speaking. In some implementations, using the overall endpointing measure can reduce the number of interactions the user has with the client device. For instance, the system can wait to render content responsive to "show me videos from my vacation" and instead can render content responsive to the full utterance "show me videos from my vacation at the Grand Canyon". This can prevent the necessity of the user repeating the utterance in response to being shown videos from a different vacation (i.e., and not of the vacation at the Grand Canyon).

Figure 1C:
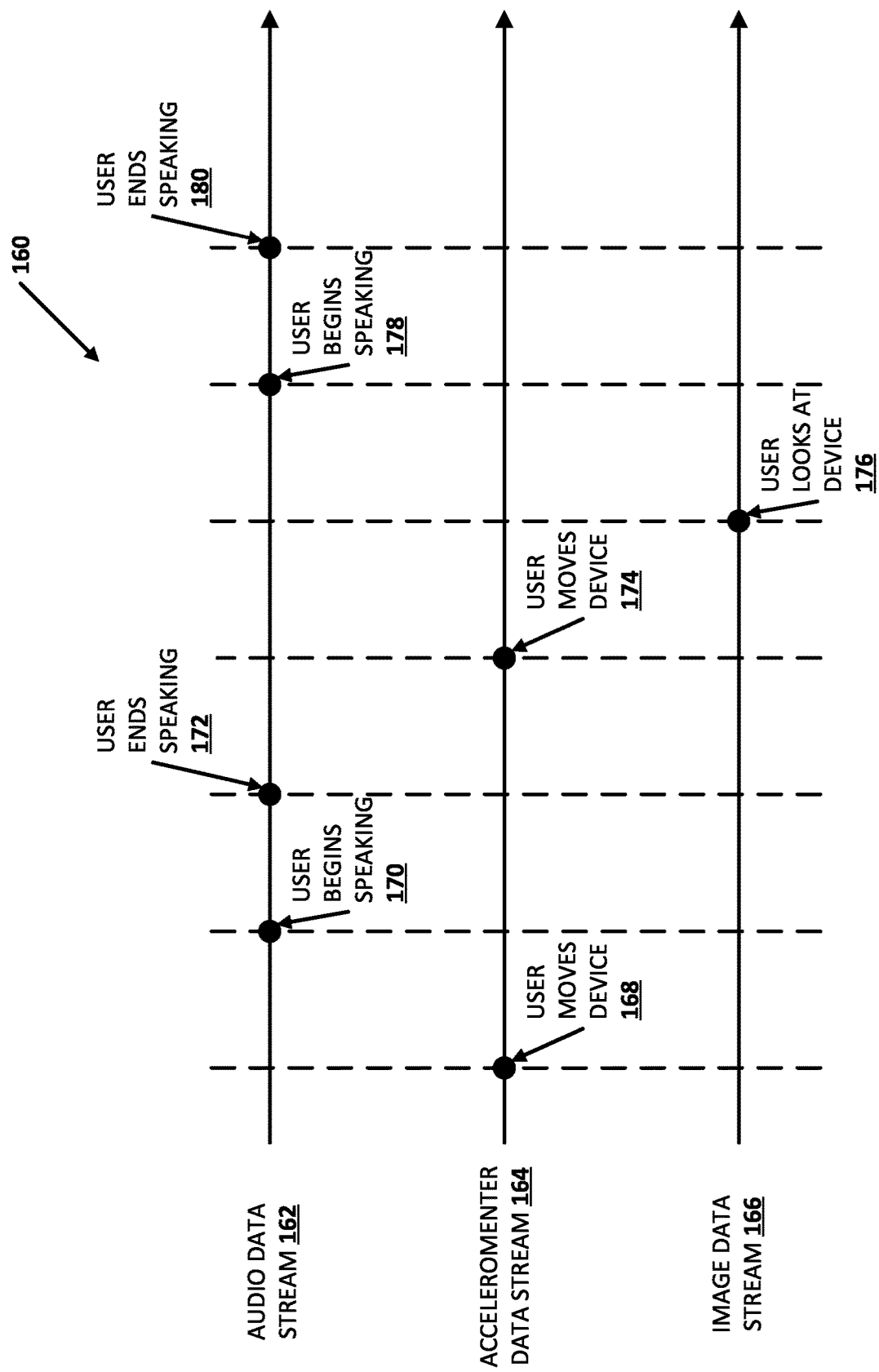
FIG. 1C illustrates another example of an audio data stream, an accelerometer data stream, and an image data stream in accordance with various implementations disclosed herein.

FIG. 1C illustrates a further example 160 in accordance with some implementations. Example 160 includes audio data stream 162, accelerometer data stream 164, and image data stream 166. In example 160, the user moves the client device at point 168, begins speaking a spoken utterance at point 170, ends speaking the spoken utterance at point 172, moves the device at point 174, and looks at the device 176. Additionally, the user begins speaking speech that is not part of the spoken utterance at point 178 and ends speaking the speech that is not part of the spoken utterance at point 180. In some implementations, the spoken utterance between points 170 and 172 as well as the speech that is not part of the spoken utterance between points 178 and 180 can be captured in audio data stream 162. Additionally or alternatively, the user moving the device at points 168 and 174 can be captured in the accelerometer data stream 164. Furthermore, the user looking at the device at point 176 can be captured in the image data stream 166.

In contrast to example 130 as illustrated in FIG. 1B, the user has completed speaking the utterance at point 172 and begins speaking speech unrelated to the utterance beginning at point 178. For example, the user can begin speaking the utterance "show me videos from my vacation at the Grand Canyon" at point 170 and can finish speaking the utterance at point 172. Additionally or alternatively, the user can begin saying "What's for dinner" at point 178 can finish saying "What's for dinner" at point 180. The system can determine an endpoint, based on the overall endpointing measure" after point 172 and before point 178 (when the user begins speaking again) based on the user moving the mobile phone away from their face at point 174 and/or the user looking at the mobile phone for responsive content at point 176. In contrast, when using only an audio-based endpointing measure (e.g., an audio-based endpointing measure with a long enough threshold), the system may not determine the endpoint until after the user speaks "show me pictures from my vacation at the Grand Canyon. What's for dinner".

Figure 2:
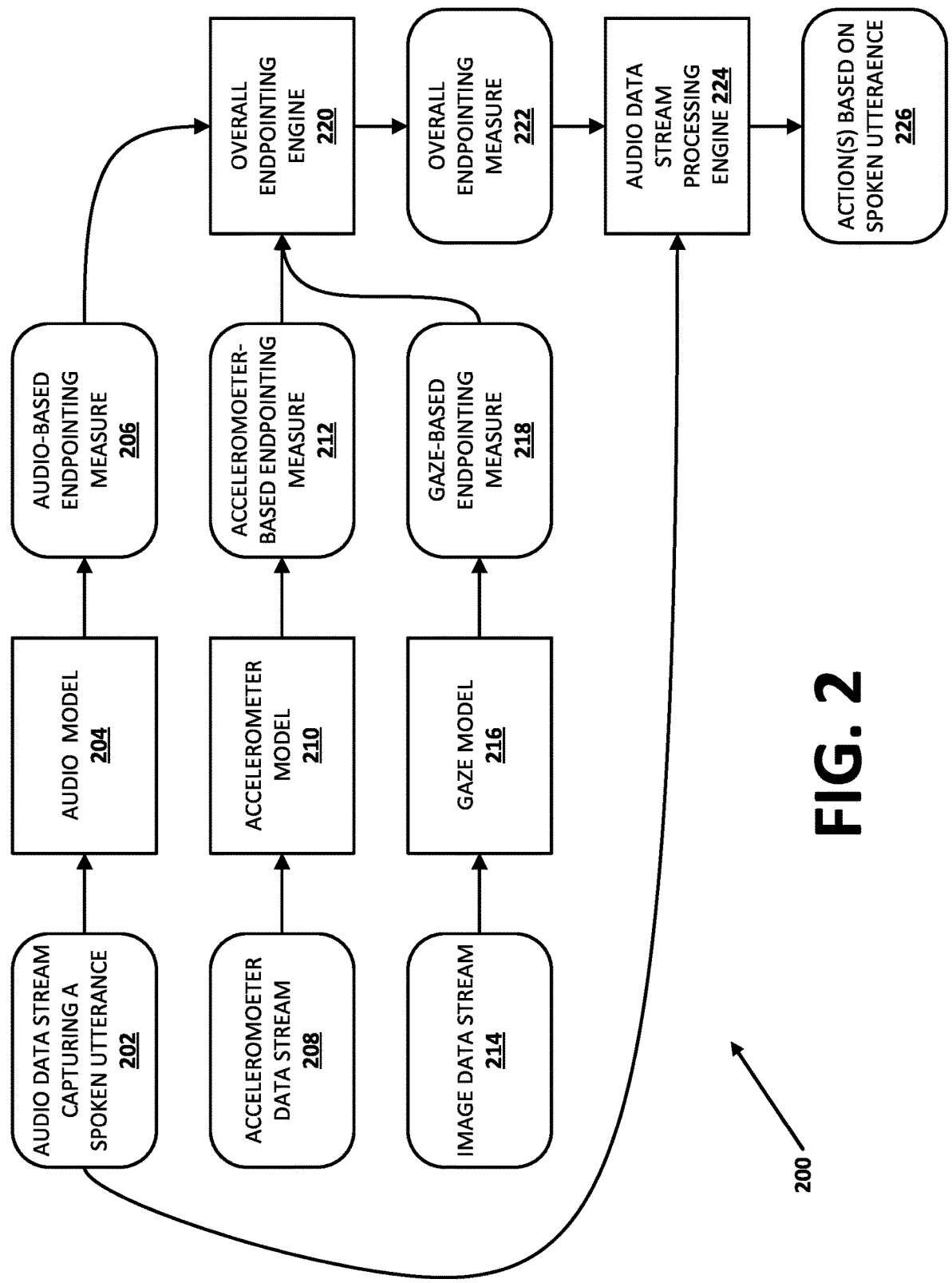
FIG. 2 illustrates an example of generating an overall endpointing measure in accordance with various implementations disclosed herein.

FIG. 2 illustrates an example 200 of generating an overall endpointing measure in accordance with some implementations. Example 200 includes an audio data stream capturing a spoken utterance 202. In some implementations, the audio data stream capturing the spoken utterance 202 can be captured via one or more microphones of a client device. The audio data stream capturing a spoken utterance 202 can be processed using an audio model 204 to generate an audio-based endpointing measure 206. In some implementations, the audio-based endpointing measure 206 can be based on processing user speech followed by a period of non-speech. The audio-based endpointing measure 206 can, for example, indicate a candidate endpoint after a predefined amount of time following a user speaking an utterance. For example, the user can speak a spoken utterance of "turn off the kitchen lights". The audio-based endpointing measure 206 can indicate a candidate endpoint, such as a candidate endpoint which is 0.25 seconds, 0.5 seconds, 1 second, and/or additional or alternative lengths of time after the user speaks "turn off the kitchen lights".

In some implementations, the accelerometer data stream 208 can capture movement of the client device and/or a gesture performed by the user of the client device. For example, the accelerometer data stream 208 can capture a variety of movement(s) and or gesture(s) including: a user moving a client device towards their mouth, the user moving the client device away from their mouth, the user picking the client device up from a surface, the user placing the client device down on a surface, the user removing the client device from a pants pocket, the user removing the client device from a purse, the user shaking the client device, the user squeezing the client device, the user pressing a physical and/or virtual button on the client device, one or more additional or alternative movement(s) and/or gestures, and/or combinations thereof. The accelerometer data stream 208 can be processed using an accelerometer model 210 to generate an accelerometer-based endpointing measure 212. In some implementations, accelerometer model 210 can classify the movement(s) and/or gesture(s) captured in the accelerometer data stream 208 as one of a fixed set of outputs.

Additionally or alternatively, the accelerometer-based endpointing measure can capture movement(s) and/or gesture(s) made by the user before and after speaking the utterance. For example, the accelerometer-based endpointing measure can capture the motion of a user taking a mobile phone out of their pocket before speaking the utterance "turn off the kitchen lights" and the motion of the user putting the mobile phone back in their pocket after speaking "turn off the kitchen lights". In some implementations, the combination of movements can provide an accelerometer-based endpointing measure indicating a higher likelihood the user has finished speaking compared to an accelerometer-based endpointing measure based on either of the movements individually. In some of those implementations, the accelerometer-based endpointing measure can indicate a higher likelihood the user has finished speaking when the combination of movements includes similar (but potentially inverse) movements. For instance, the combination of a user picking a mobile phone up off a table and placing the mobile phone back on the table are similar (but potentially inverse) movements that may indicate a higher likelihood the user has finished speaking compared to the user picking up the mobile phone off the table or placing the mobile phone on the table individually.

Additionally or alternatively, the image data stream 214 can be processed using a gaze-based model 216 to generate a gaze-based endpointing measure 218. In some implementations, the gaze-based endpointing measure 218 can provide an indication of whether the user has a directed gaze towards the client device, such as whether the user has a directed gaze towards a display of the client device. Additionally or alternatively, the gaze-based endpointing measure 218 can indicate the user is not looking at the client device.

In some implementations, an overall endpointing engine 220 can generate an overall endpointing measure 222 based on the audio-based endpointing measure 206, the accelerometer-based endpointing measure 212, the gaze-based endpointing measure 218, one or more additional or alternative measures, and/or combinations thereof.

In some implementations, an audio data stream processing engine 224 can process the audio data stream capturing the spoken utterance 202 based on the overall endpointing measure 222 to generate one or more actions based on the spoken utterance 226. For example, audio data stream processing engine 224 can process the spoken utterance using an automatic speech recognition (ASR) model to generate a text representation of the spoken utterance; displaying a transcript of the text representation of the spoken utterance; transmitting the text representation of the spoken utterance to a natural language understanding (NLU) model; generating a response to the spoken utterance; rendering content responsive to the spoken utterance (e.g., rendering an audio based response to the spoken utterance, rendering image(s) requested by the spoken utterance, rendering video requested by the spoken utterance, etc.); performing action(s) based on the spoken utterance (e.g., controlling a smart device based on the spoken utterance, etc.).

In some implementations, the audio model 204, the accelerometer model 210, and/or the gaze model 216 can each be standalone models. In some other implementations, the audio model 204, the accelerometer model 210 and/or the gaze model 216 can be integrated into a single endpointing model (not depicted). Additionally or alternatively, the audio model 204 can be integrated within an automatic speech recognition (ASR) model (not depicted), where the system can generate a text representation of the spoken utterance and determine candidate endpoint(s) using the same model.

In some implementations, the audio model 204, the accelerometer model 210, and/or the gaze model 216 can each be a variety of neural network models including a feed-forward neural network, a recurrent neural network, a long/short term memory network, a gated recurrent unit network, a convolutional neural network, one or more alternative networks, and/or combinations thereof. For example, the accelerometer model 210 and/or the gaze model 216 can be a convolutional neural network trained offline on a labeled dataset. In some implementations, the image data stream 214 can include a sequence of two-dimensional images. Additionally or alternatively, the sequence of images in the image data stream 214 can be resized, subsampled, altered using one or more additional image processing techniques, and/or combinations thereof. In some implementations, the accelerometer data stream 208 can include a sequence of one-dimensional data captured via an accelerometer of the client device.

In some implementations, the spoken utterance captured in the audio data stream 202 can be a voice query (e.g., a voice query for a voice search, for an automated assistant command, etc.). In some of those implementations, the voice query may be triggered using a hotword (e.g., "Hey Assistant", "Ok Assistant", "Assistant", etc.) and/or a physical gesture (e.g., tapping on an icon, squeezing the device, etc.). In response to the user triggering the query, the system can begin capturing speech input (e.g., the spoken utterance) as well as capturing the accelerometer data stream and/or the image data stream. In some implementations, separate models can process the audio data stream, the accelerometer data stream, and/or the image data stream in a streaming fashion. Additionally or alternatively, the user can begin to speak the spoken utterance, which can trigger a start-of-speech event from the audio-based endpointing measure. In some implementations, the audio-based endpointing measure can indicate speech or no-speech. In some implementations, the audio-based endpointing measure can be derived from the streaming ASR output (where the start-of-speech event may be observed the first time the system makes a prediction for a single word or phoneme). In some implementations, a text representation of the spoken utterance can be transcribed in real time by the ASR engine while the user continues speaking the utterance. In some implementations, the latest hypothesis of the text representation of the utterance can be displayed to the user in real-time as the user continues to talk. If the user pauses, the system can consider the pause as a candidate endpointing event. With only an audio-based endpointing measure, the system can generate an end-of-speech likelihood score (e.g., the audio-based endpointing measure) based on waiting for a predefined amount of time as well as considering whether the candidate text representation of the utterance is "complete" (e.g., is the text representation of the utterance a command the system can provide actions based on).

In some implementations, detecting movement of the device away from the user can be a sign the query has ended. In some of those implementations, the system can boost the likelihood of an endpointing event (e.g., the accelerometer-based endpointing measure can boost the overall endpointing measure). In some implementations, if the same or similar (but inverse) motion the user performed before beginning the query is detected, the system can further increase the likelihood of an endpointing event (e.g., the accelerometer-based endpointing measure can boost the overall endpointing measure). Furthermore, the user looking at the display of the client device can be a signal the user may be waiting for a response and the gaze-based endpointing measure can boost the overall endpointing measure to increase the likelihood of an endpointing event.

Additionally or alternatively, the absence of signals in the accelerometer-based endpointing measure and/or the gaze-based endpointing measure may indicate the user has not finished speaking, and thus the system should keep the endpointer open (even when the audio-based endpointing measure may have triggered and end-of-speech event). For example, when the voice query is a request for visual based responsive content (e.g., the user query of "show me a photograph of John Doe" is a request for responsive content), in the absence of a signal in the accelerometer-based endpointing measure and/or a gaze-based endpointing measure the system can keep the endpointer open even when the audio-based endpointing measure indicates an end-of-speech event. In some of those implementations, if the system detects the user is not looking at the client device and/or the client device remains close to the user's mouth, the system can keep the endpointer open (because the user is not likely to be waiting for the response).

In some implementations, a smart caching strategy can be used to prefetch results for a query that would have otherwise have been end pointed. At the same time, the system can continue listening for additional speech input from the user, and update the prefetched results if/when the user continues to speak. When the user looks at the display of the client device (i.e., the gaze-based endpointing measure) and/or takes the client device away from their mouth (i.e., the accelerometer-based endpointing measure), the system can display the precached results to the user. In some implementations, the user does not perceive any additional latency since they were not looking at the display for a result. At the same time, the system can keep the microphone open in case the user wants to add to the query (e.g., the user wants to add "in Florida" to the end of a "show me photos of the beach" query).

In some implementations, the system can modify the overall endpointer measure using an adjustment model on top of the existing audio-based endpointing measure. In some implementations, the boosting of the score can be the output of the model. For example, the score can be discretized in absolute or relative buckets (e.g., +15%, +30%, etc.), while the refinement signals can be collected from the user's interaction with the client device.

Figure 3:
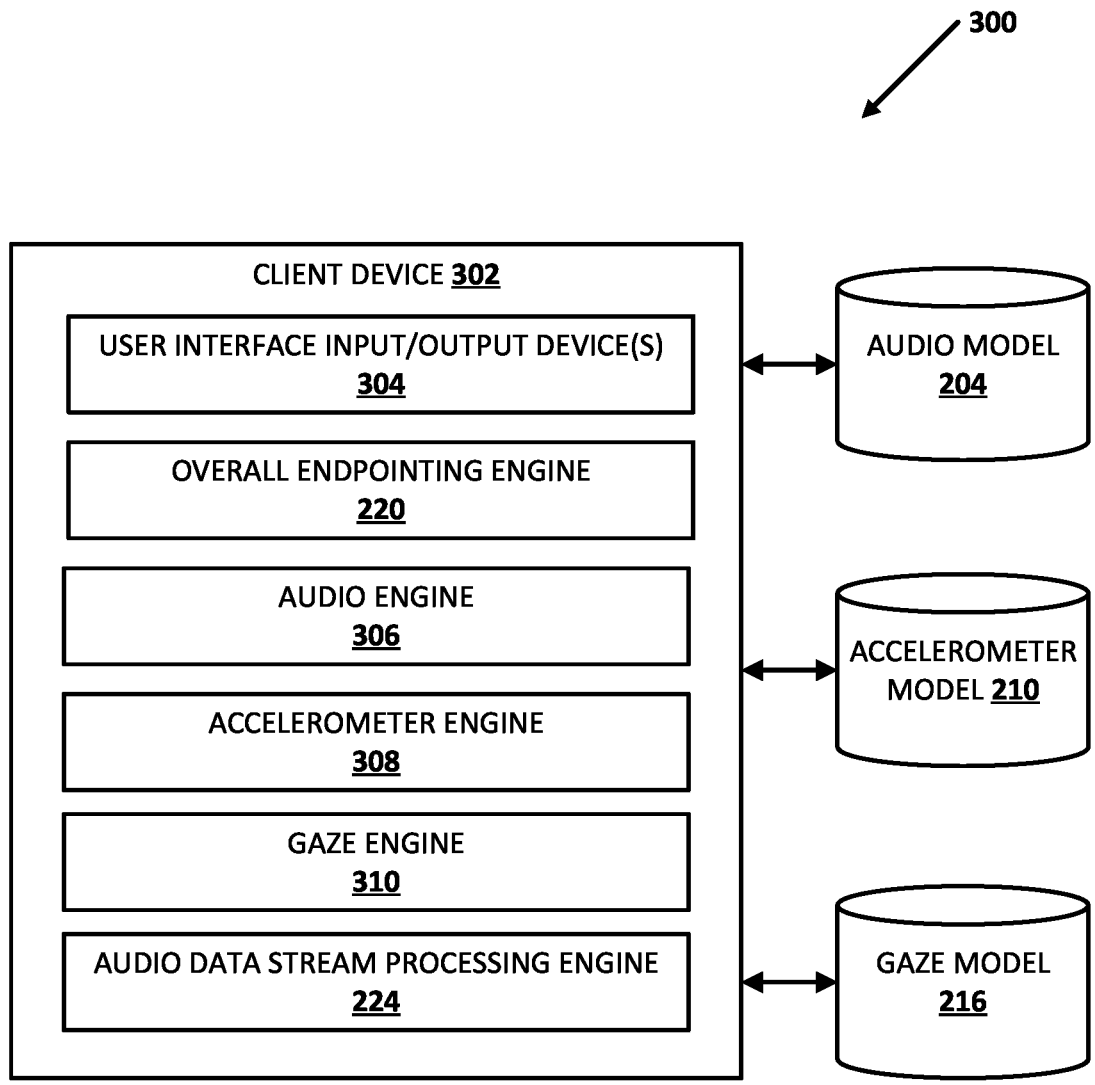
FIG. 3 illustrates an example environment in which various implementations disclosed herein may be implemented.

FIG. 3 illustrates a block diagram of an example environment 300 in which various implementations may be implemented. The example environment 300 includes a client device 302 which can include user interface input/output device(s) 304, overall endpointing engine 220, audio engine 308, accelerometer engine 310, gaze engine 312, audio data stream processing engine 224, and/or one or more additional or engines (not depicted). Additionally or alternatively, client device 302 may be associated with audio model 204, accelerometer model 210, gaze-based model 216, and/or one or more additional components (not depicted).

In some implementations, client device 302 may include user interface input/output devices 304, which may include, for example, a physical keyboard, a touch screen (e.g., implementing a virtual keyboard or other textual input mechanisms), a microphone, a camera, a display screen, and/or speaker(s). Additionally or alternatively, client device 302 can include a variety of sensors (not depicted) such as an accelerometer, a gyroscope, a Global Positioning System (GPS), a pressure sensor, a light sensor, a distance sensor, a proximity sensor, a temperature sensor, one or more additional sensors, and/or combinations thereof. The user interface input/output devices may be incorporated with one or more client devices 302 of a user. For example, a mobile phone of the user may include the user interface input/output device(s); a standalone digital assistant hardware device may include the user interface input/output device; a first computing device may include the user interface input device(s) and a separate computing device may include the user interface output device(s); etc. In some implementations, all or aspects of client device 302 may be implemented on a computing system that also contains the user interface input/output devices. In some implementations client device 302 may include an automated assistant (not depicted), and all or aspects of the automated assistant may be implemented on computing device(s) that are separate and remote from the client device that contains the user interface input/output devices (e.g., all or aspects may be implemented "in the cloud"). In some of those implementations, those aspects of the automated assistant may communicate with the computing device via one or more networks such as a local area network (LAN) and/or a wide area network (WAN) (e.g., the Internet).

Some non-limiting examples of client device 302 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. Client device 302 may include one or more memories for storage of data and software applications, one or more processors for accessing data and executing applications, and other components that facilitate communication over a network. The operations performed by client device 302 may be distributed across multiple computing devices. For example, computing programs running on one or more computers in one or more locations can be coupled to each other through a network. In some implementations, client device 302 can be a mobile phone with a front facing camera and/or an accelerometer, a smart watch with an accelerometer, a standalone hardware device with a front facing camera, etc.

Audio engine 306 can process an audio data stream capturing a spoken utterance (such as audio data stream 102, 132, 162, 202, and/or alternative data stream(s)) using audio model 204 to generate an audio-based endpointing measure (such as audio-based endpointing measure 206). In some implementations, the audio model 204 can be a standalone audio endpointing model. In some other implementations, the audio model 204 can be integrated into additional model(s), such as integrated into an automatic speech recognition (ASR) model that can determine one or more candidate endpoints while determining while determining one or more candidate text representations of the spoken utterance captured in the audio data stream. In some other implementations, the audio model 204 can be integrated with the accelerometer model 210 and/or the gaze model 216. For example, the audio engine 306 can process an audio data stream captured via one or more microphones of client device 302 using audio model 204 to generate an audio-based endpointing measure.

Accelerometer engine 308 can be used to process an accelerometer data stream captured via an accelerometer of client device 302 (such as accelerometer data stream 104, 134, 164, and/or 208) using accelerometer model 210 to generate an accelerometer-based endpointing measure (such as accelerometer-based endpointing measure 212). In some implementations, accelerometer model 210 can classify movement(s) and/or gesture(s) captured in the accelerometer data stream.

Gaze engine 310 can be used to process an image data stream captured via camera(s) of client device 302 (such as image data stream 106, 136, 166, and/or 214) using gaze model 216 to generate a gaze-based endpointing measure (such as gaze-based endpointing measure 218). In some implementations, gaze model 216 can predict whether the user is looking at the display and/or where on the display the user is looking.

In some implementations, the overall endpointing engine 220 can generate the overall endpointing measure (such as overall endpointing measure 222) based on the audio-based endpointing measure, accelerometer-based endpointing measure, and/or gaze-based endpointing measure (such as audio-based endpointing measure 206, accelerometer-based endpointing measure 212, and/or gaze-based endpointing measure 218).

Additionally or alternatively, audio data stream processing engine 224 can perform one or more actions based on the spoken utterance. In some implementations, the system can perform one or more actions based on the spoken utterance including processing the spoken utterance using an automatic speech recognition (ASR) model to generate a text representation of the spoken utterance; displaying a transcript of the text representation of the spoken utterance; transmitting the text representation of the spoken utterance to a natural language understanding (NLU) model; generating a response to the spoken utterance; rendering content responsive to the spoken utterance (e.g., rendering an audio based response to the spoken utterance, rendering image(s) requested by the spoken utterance, rendering video requested by the spoken utterance, etc.); performing action(s) based on the spoken utterance (e.g., controlling a smart device based on the spoken utterance, etc.).

Figure 4:
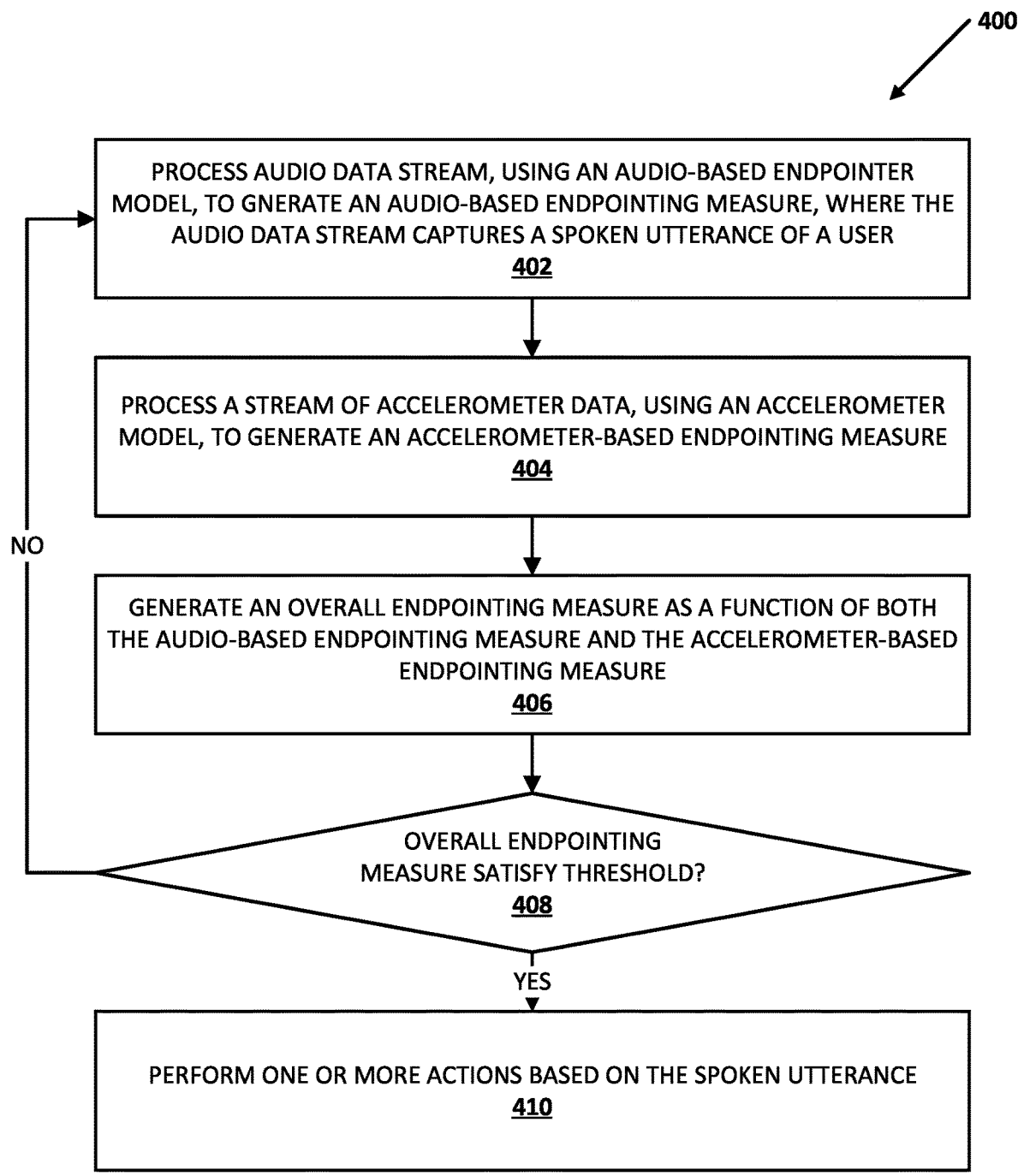
FIG. 4 is a flowchart illustrating an example of generating an overall endpointing measure in accordance with various implementations disclosed herein.

FIG. 4 is a flowchart illustrating an example process of 400 of generating an overall endpointing measure as a function of both an audio-based endpointing measure and an accelerometer-based endpointing measure in accordance with various implementations disclosed herein. For convenience, the operations of the flowchart are described with reference to a system that performs the operations. This system may include various components of various computer systems, such as one or more components of client device 302, client device 802, and/or computing system 910. Moreover, while operations of process 400 are shown in a particular order, this is not meant to be limiting. One or more operations may be reordered, omitted, and/or added.

At block 402, the system processes an audio data stream, using an audio endpointer model, to generate an audio-based endpointing measure. In some implementations, the audio data stream captures a spoken utterance of a user. For example, the audio data stream can capture a user speaking the utterance "show me pictures from my vacation in South America". In some implementations, the audio-based endpointing measure can indicate a candidate audio-based endpoint in the audio data. For instance, the system can generate a candidate audio-based endpoint a threshold amount of time after the user finishes saying "show me pictures from my vacation in South America". In some implementations, the audio data stream can be captured via one or more microphones of a client device.

At block 404, the system processes a stream of accelerometer data, using an accelerometer model, to generate an accelerometer-based endpointing measure. In some implementations, the accelerometer data stream can be captured via one or more accelerometers of the client device. The accelerometer data stream can capture movement(s) of the client device and/or gesture(s) by the user of the client device made before, during, and after the user speaks the utterance. For instance, the stream of accelerometer data can capture the user removing a mobile phone from their pocket before speaking the utterance "show me pictures from my vacation in South America". Additionally or alternatively, the stream of accelerometer data can capture any movement of the mobile phone made by the user while the user is speaking the utterance. Furthermore, the stream of accelerometer data can capture the user orienting a display of the mobile phone towards their face subsequent to speaking the utterance. In some implementations, the accelerometer model can be stored locally at the client device and the accelerometer data stream can be processed locally at the client device. In some other implementations, the accelerometer model can be stored at an additional computing device remote from the client device, and the accelerometer data stream can be processed remotely at the additional computing device. In some implementations, the system can generate the accelerometer-based endpointing measure using accelerometer engine 308 described herein with respect to FIG. 3.

At block 406, the system generates an overall endpointing measure as a function of both the audio-based endpointing measure and the accelerometer-based endpointing measure. In some implementations, the system can generate the overall endpointing measure using the overall endpointing engine described herein with respect to FIG. 2. In some implementations, the accelerometer-based endpointing measure can boost the audio-based endpointing measure. For instance, an accelerometer-based endpointing measure indicating the user moving the mobile phone away from their mouth can boost an audio-based endpointing measure. Similarly, an accelerometer-based endpointing measure can decrease an audio-based endpointing measure. For instance, an accelerometer-based endpointing measure indicating the user moving the mobile phone towards their mouth can decrease the audio-based endpointing measure. Additionally or alternatively, a sequence of movements captured in the accelerometer-based endpointing measure can boost the overall endpointing measure. For instance, the user moving the mobile phone towards their mouth followed by the user moving the mobile phone away from their mouth can provide a stronger indication a candidate endpoint is a real endpoint than either movement individually.

At block 408, the system determines whether the overall endpointing measure satisfies a threshold. If the overall endpointing measure satisfies the threshold, the system can continue to block 410. If the overall endpointing measure does not satisfy the threshold, the system can proceed back to block 402, process an additional portion of the audio data stream to generate an additional audio-based endpointing measure, proceed to block 404 and process an additional portion of the accelerometer data stream to generate an additional accelerometer-based endpointing measure, and proceed to block 406 to generate an additional overall endpointing measure as a function of both the additional audio-based endpointing measure and the additional accelerometer-based endpointing measure.

At block 410, the system performs one or more actions based on the spoken utterance. The system can perform one or more actions based on the spoken utterance including processing the spoken utterance using an automatic speech recognition (ASR) model to generate a text representation of the spoken utterance; displaying a transcript of the text representation of the spoken utterance; transmitting the text representation of the spoken utterance to a natural language understanding (NLU) model; generating a response to the spoken utterance; rendering content responsive to the spoken utterance (e.g., rendering an audio based response to the spoken utterance, rendering image(s) requested by the spoken utterance, rendering video requested by the spoken utterance, etc.); performing action(s) based on the spoken utterance (e.g., controlling a smart device based on the spoken utterance, etc.). For instance, the system can render images of the user's vacation to South America in response to the utterance "show me pictures of my vacation in South America". In some implementations, the system can perform one or actions based on the spoken utterance using the audio data stream processing engine 224 described herein.

Figure 5:
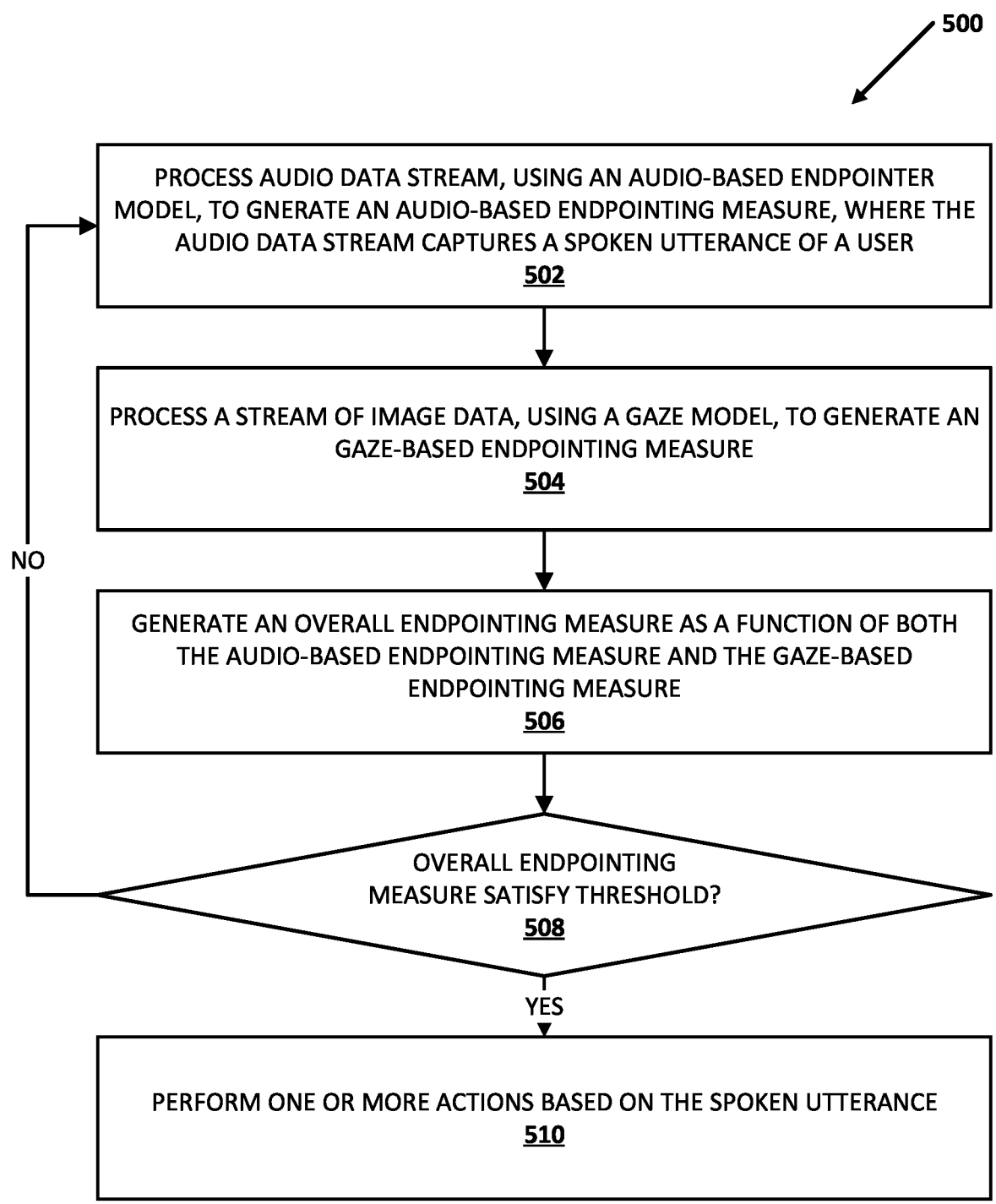
FIG. 5 is a flowchart illustrating another example of generating an overall endpointing measure in accordance with various implementations disclosed herein.

FIG. 5 is a flowchart illustrating an example process of 500 of generating an overall endpointing measure as a function of both an audio-based endpointing measure and a gaze-based endpointing measure in accordance with various implementations disclosed herein. For convenience, the operations of the flowchart are described with reference to a system that performs the operations. This system may include various components of various computer systems, such as one or more components of client device 302, client device 802, and/or computing system 910. Moreover, while operations of process 500 are shown in a particular order, this is not meant to be limiting. One or more operations may be reordered, omitted, and/or added.

At block 502, the system processes an audio data stream, using an audio-based endpointer model, to generate an audio-based endpointing measure. In some implementations, the audio data stream captures a spoken utterance of a user. For instance, as described with respect to process 400 of FIG. 4, the audio data stream can capture a spoken utterance of "show me pictures of my vacation to South America". In some implementations, the system can process the audio data stream using audio engine 306 described herein.

At block 504, the system processes a stream of image data, using a gaze model, to generate a gaze-based endpointing measure. In some implementations, the stream of image data can be captured via a front-facing camera of a client device, such as a mobile phone. In some implementations, the image data stream can be two-dimensional image frames. In some of those implementations, the image frames in the image data stream can be resized, subsampled, processed with alternative image processing techniques, and/or combinations thereof. In some implementations, the gaze model can be stored locally at the client device and the image data stream can be processed locally at the client device. In some other implementations, the gaze model can be stored at an additional computing device remote from the client device, and the image data stream can be processed remotely at the additional computing device. In some implementations, the system can process the stream of image data using gaze engine 310 described herein.

At block 506, the system generates an overall endpointing measure as a function of both the audio-based endpointing measure and the gaze-based endpointing measure. In some implementations, the system can generate the overall endpointing measure using overall endpointing engine 220 described herein.

At block 508, the system determines whether the overall endpointing measure satisfies a threshold. If the overall endpointing measure satisfies the threshold, the system can continue to block 510. If the overall endpointing measure does not satisfy the threshold, the system can proceed back to block 502, process an additional portion of the audio data stream to generate an additional audio-based endpointing measure, proceed to block 404 and process an additional portion of the image data stream to generate an additional gaze-based endpointing measure, and proceed to block 506 to generate an additional overall endpointing measure as a function of both the additional audio-based endpointing measure and the additional gaze-based endpointing measure.

At block 510, the system performs one or more actions based on the spoken utterance. As described above, the system can perform one or more actions based on the spoken utterance including processing the spoken utterance using an automatic speech recognition (ASR) model to generate a text representation of the spoken utterance; displaying a transcript of the text representation of the spoken utterance; transmitting the text representation of the spoken utterance to a natural language understanding (NLU) model; generating a response to the spoken utterance; rendering content responsive to the spoken utterance (e.g., rendering an audio based response to the spoken utterance, rendering image(s) requested by the spoken utterance, rendering video requested by the spoken utterance, etc.); performing action(s) based on the spoken utterance (e.g., controlling a smart device based on the spoken utterance, etc.). For instance, the system can render images of the user's vacation to South America in response to the utterance "show me pictures of my vacation in South America". In some implementations, the system can perform the one or more actions using audio data stream processing engine 224 described herein.

Figure 6:
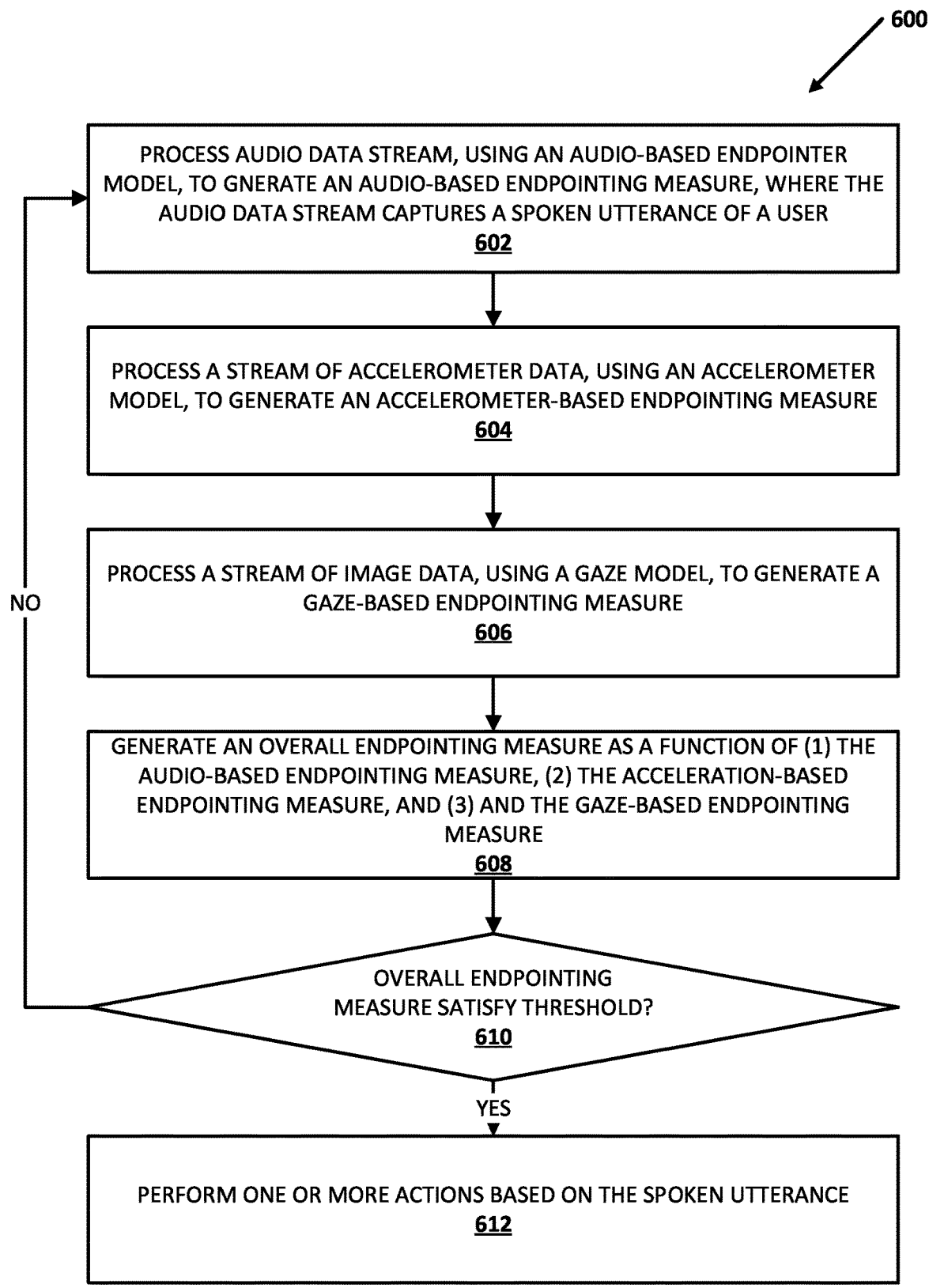
FIG. 6 is a flowchart illustrating another example of generating an overall endpointing measure in accordance with various implementations disclosed herein.

FIG. 6 is a flowchart illustrating an example process of 600 of generating an overall endpointing measure as a function of both an audio-based endpointing measure, an accelerometer-based endpointing measure, and a gaze-based endpointing measure in accordance with various implementations disclosed herein. For convenience, the operations of the flowchart are described with reference to a system that performs the operations. This system may include various components of various computer systems, such as one or more components of client device 302, client device 802, and/or computing system 910. Moreover, while operations of process 600 are shown in a particular order, this is not meant to be limiting. One or more operations may be reordered, omitted, and/or added.

At block 602, the system processes an audio data stream, using an audio-based endpointer model, to generate an audio-based endpointing measure. In some implementations, the audio data stream captures a spoken utterance of a user. In some implementations, the system processes the audio data stream using audio engine 306 described herein.

At block 604, the system processes a stream of accelerometer data, using an accelerometer model, to generate an accelerometer-based endpointing measure. In some implementations, the system processes the stream of accelerometer data using accelerometer engine 308 described herein.

At block 606, the system processes a stream of image data, using a gaze model, to generate a gaze-based endpointing measure. At some implementations, the system processes the stream of image data using gaze engine 310 described herein.

At block 608, the system generates an overall endpointing measure as a function of (1) the audio-based endpointing measure, (2) the accelerometer-based endpointing measure, and (3) the gaze-based endpointing measure. In some implementations, the system generates the overall endpointing measure using overall endpointing engine 220 described herein.

At block 610, the system determines whether the overall endpointing measure satisfies a threshold.

If the overall endpointing measure satisfies the threshold, the system can continue to block 612. If the overall endpointing measure does not satisfy the threshold, the system can proceed back to block 602, process an additional portion of the audio data stream to generate an additional audio-based endpointing measure, proceed to block 604 and process an additional portion of the accelerometer data stream to generate an additional accelerometer-based endpointing measure, proceed to block 606 and process an additional portion of the image data stream to generate an additional gaze-based endpointing measure, and proceed to block 608 to generate an additional overall endpointing measure as a function of the additional audio-based endpointing measure, and the additional accelerometer-based endpointing measure and/or the additional gaze-based endpointing measure.

At block 612, the system performs one or more actions based on the spoken utterance. As described above, the system can perform one or more actions based on the spoken utterance including processing the spoken utterance using an automatic speech recognition (ASR) model to generate a text representation of the spoken utterance; displaying a transcript of the text representation of the spoken utterance; transmitting the text representation of the spoken utterance to a natural language understanding (NLU) model; generating a response to the spoken utterance; rendering content responsive to the spoken utterance (e.g., rendering an audio based response to the spoken utterance, rendering image(s) requested by the spoken utterance, rendering video requested by the spoken utterance, etc.); performing action(s) based on the spoken utterance (e.g., controlling a smart device based on the spoken utterance, etc.). For instance, the system can render images of the user's vacation to South America in response to the utterance "show me pictures of my vacation in South America". In some implementations, the system performs the one or more actions using audio data stream processing engine 224 described herein.

Figure 7:
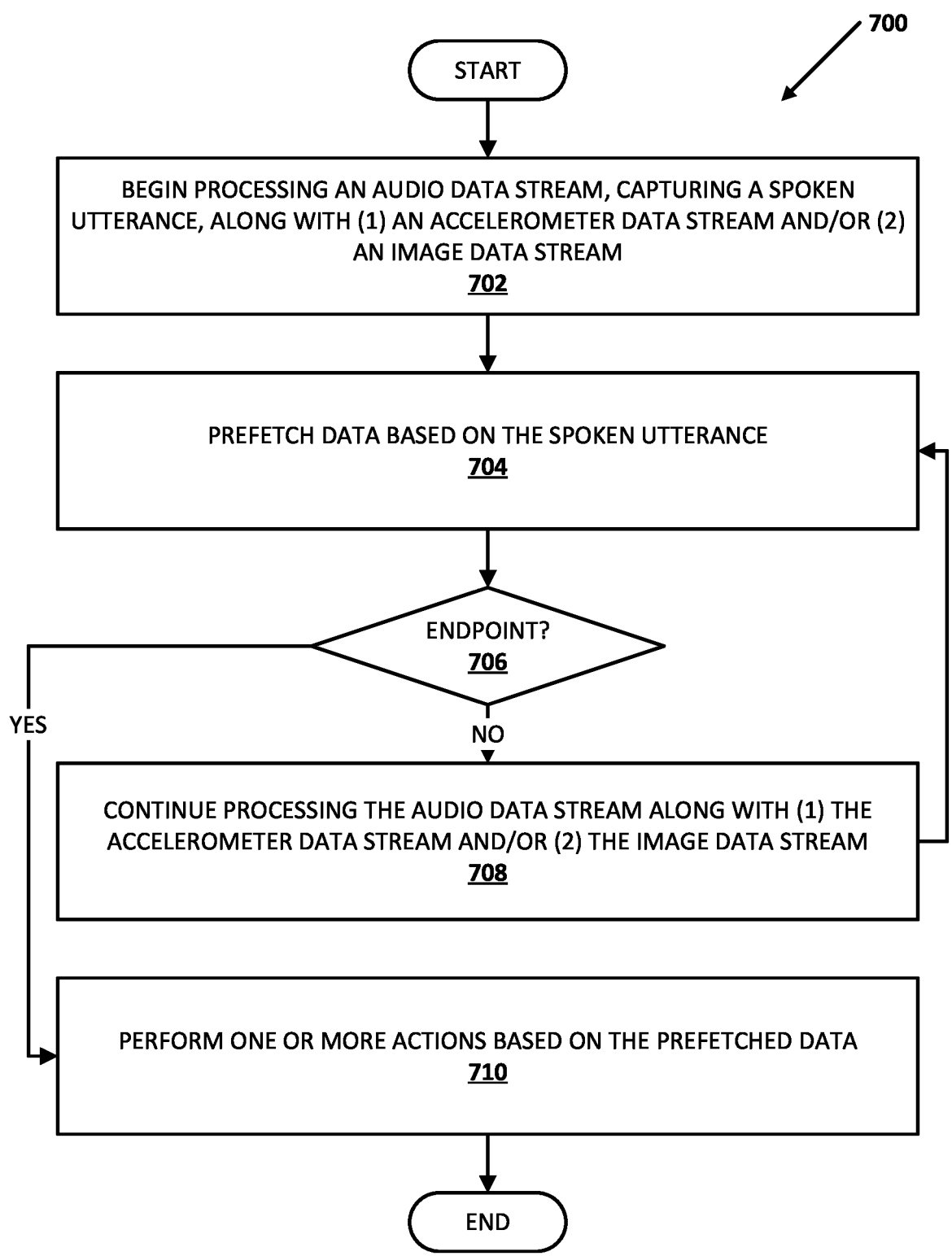
FIG. 7 is a flowchart illustrating an example of prefetching data based on an overall endpointing measure in accordance with various implementations disclosed herein.

FIG. 7 is a flowchart illustrating an example process of 700 of prefetching data based on a spoken utterance using an overall endpointing measure in accordance with various implementations disclosed herein. For convenience, the operations of the flowchart are described with reference to a system that performs the operations. This system may include various components of various computer systems, such as one or more components of client device 302, client device 802, and/or computing system 910. Moreover, while operations of process 700 are shown in a particular order, this is not meant to be limiting. One or more operations may be reordered, omitted, and/or added.

At block 702, the system begins processing an audio data stream, capturing a spoken utterance, along with (1) an accelerometer data stream and/or (2) an image data stream. In some implementations, the system uses audio engine 302 to process the audio data stream (e.g., audio data stream 102, 132, 162, or 202) using audio model 204 to generate audio-based endpointing measure 206 described herein.

At block 704, the system prefetches data based on the spoken utterance. In some implementations, the system can prefetch data when the system determines a candidate endpointer indicated by an audio-based endpointing measure (e.g., when the user pauses speaking while speaking an utterance). In some of those implementations, the system can prefetch data based on a candidate endpointer determined based on only the audio-based endpointing measure (i.e., system can prefetch data based on a candidate endpointer determined based on the audio-based endpointing measure without using accelerometer-based endpointing measure and/or the gaze-based endpointing measure). For example, the user can speak the utterance "show me images from the party last Tuesday", where the user pauses between "show me the images from the party" and "last Tuesday". The system can prefetch responsive content based on "show me the images from the party" in response to the user pausing. Additionally or alternatively, the system can prefetch response content based on "show me the images from the party last Tuesday" in response to the user speaking the entire utterance.

At block 706, the system determines whether there is an endpoint in the audio data stream. In some implementations, the system can determine whether the candidate endpointer is a true endpoint based on the accelerometer-based endpointing measure and/or the gaze-based endpointing measure. In other words, the system can determine whether the candidate endpoint, indicated by the audio-based endpointing measure, is a true endpoint based on the accelerometer-based endpointing measure and/or the gaze-based endpointing measure. For example, if accelerometer-based endpointing measure indicates the user is holding the client up to their mouth, the system can determine the candidate endpoint indicated by the audio-based endpointing measure is not an endpoint. Similarly, if the gaze-based endpointing measure indicates the user is not looking at the display of the client device, the system can determine the candidate endpoint indicated by the audio-based endpointing measure is not an endpoint. Conversely, if the gaze-based endpointing measure indicates the user is looking at the device, the system can determine the user is finished speaking and is waiting for a response. Similarly, if the accelerometer-based endpointing measure indicates the user has moved the client device away from their mouth, the system can determine the candidate endpoint indicated by the audio-based endpointing measure is an endpoint. For example, if the user is holding a mobile phone by their mouth after speaking "show me the images from the party" and/or the user is not looking at the display, the system can determine the candidate endpoint is not an endpoint. Conversely, if the system determines the user is looking at the display after speaking "show me the images from the party last Tuesday", the system can determine the candidate endpoint is an endpoint. If the system determines a candidate endpoint is an endpoint, the system proceeds to block 710. If the system determines a candidate endpoint is not an endpoint, the system proceeds to block 708.

At block 708, the system continues processing the audio data stream along with (1) the accelerometer data stream and/or (2) the image data stream. For example, if the system determines the pause after the user speaks "show me the images from the party", the system can continue processing the audio data stream, accelerometer data stream, and/or image data stream. In some implementations, after continuing to process the audio data stream along with (1) the accelerometer data stream and/or (2) the image data stream, the system can proceed back to block 704 and prefetch additional data based on the additional portion of the spoken utterance. For example, the system can process the additional portion of the audio data stream to prefetch content responsive to "show me the images from the party last Tuesday".

At block 710, the system performs one or more actions based on the prefetched data. In some implementations, the system can display content responsive to the spoken utterance. For example, the system can display pictures from the party the user attended last Tuesday.

Figure 8:
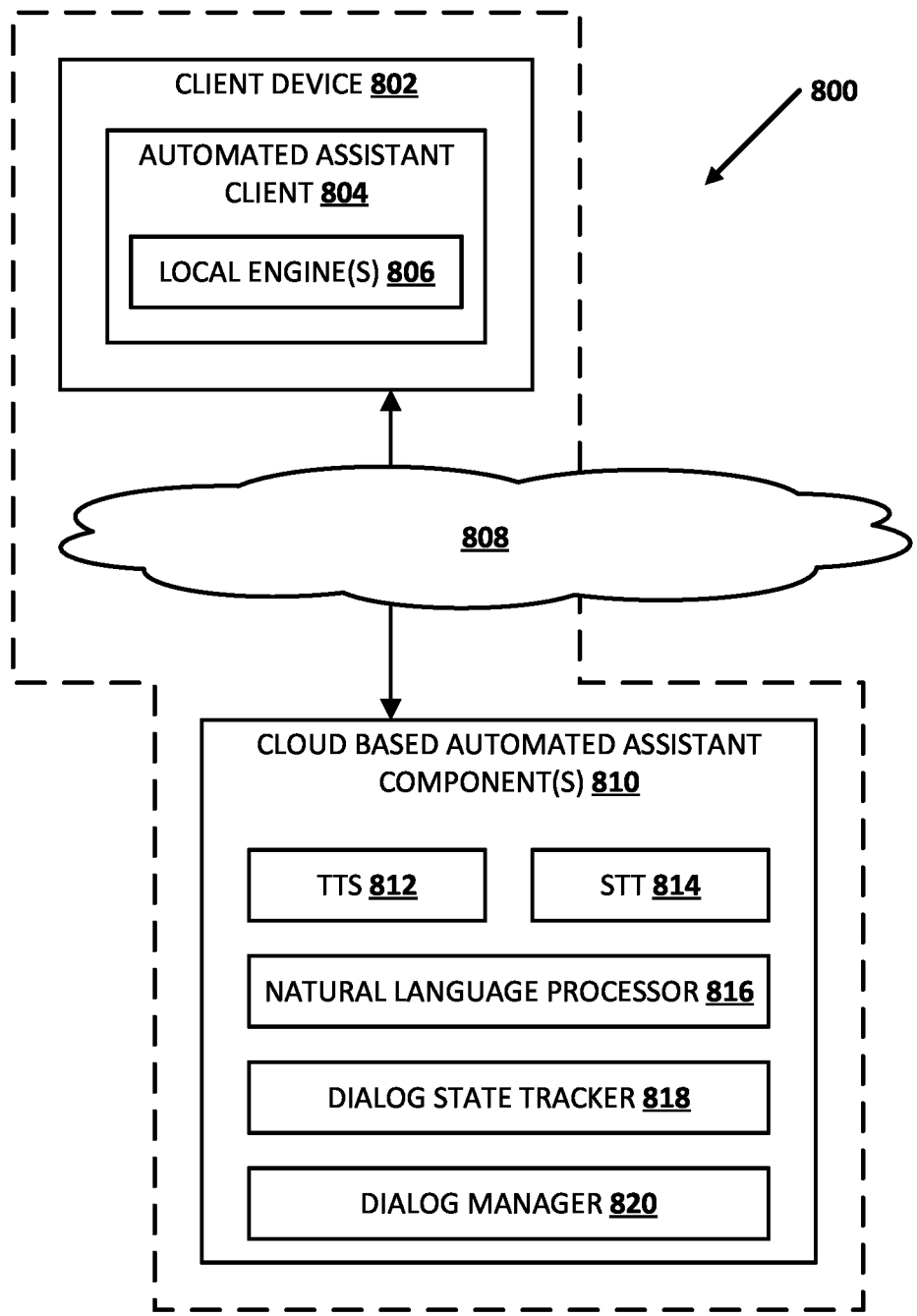
FIG. 8 illustrates another example environment in which various implementations disclosed herein may be implemented.

Turning now to FIG. 8, an example environment is illustrated where various implementations can be performed. FIG. 8 is described initially, and includes a client computing device 802, which executes an instance of an automated assistant client 804. One or more cloud-based automated assistant components 810 can be implemented on one or more computing systems (collectively referred to as a "cloud" computing system) that are communicatively coupled to client device 802 via one or more local and/or wide area networks (e.g., the Internet) indicated generally at 808.

An instance of an automated assistant client 804, by way of its interactions with one or more cloud-based automated assistant components 810, may form what appears to be, from the user's perspective, a logical instance of an automated assistant 800 with which the user may engage in a human-to-computer dialog. An instance of such an automated assistant 800 is depicted in FIG. 8. It thus should be understood that in some implementations, a user that engages with an automated assistant client 804 executing on client device 802 may, in effect, engage with his or her own logical instance of an automated assistant 800. For the sakes of brevity and simplicity, the term "automated assistant" as used herein as "serving" a particular user will often refer to the combination of an automated assistant client 804 executing on a client device 802 operated by the user and one or more cloud-based automated assistant components 810 (which may be shared amongst multiple automated assistant clients of multiple client computing devices). It should also be understood that in some implementations, automated assistant 800 may respond to a request from any user regardless of whether the user is actually "served" by that particular instance of automated assistant 800.

The client computing device 802 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 802 may optionally operate one or more other applications that are in addition to automated assistant client 804, such as a message exchange client (e.g., SMS, MMS, online chat), a browser, and so forth. In some of those various implementations, one or more of the other applications can optionally interface (e.g., via an application programming interface) with the automated assistant 800, or include their own instance of an automated assistant application (that may also interface with the cloud-based automated assistant component(s) 810).

Automated assistant 800 engages in human-to-computer dialog sessions with a user via user interface input and output devices of the client device 802. To preserve user privacy and/or to conserve resources, in many situations a user must often explicitly invoke the automated assistant 800 before the automated assistant will fully process a spoken utterance. The explicit invocation of the automated assistant 800 can occur in response to certain user interface input received at the client device 802. For example, user interface inputs that can invoke the automated assistant 800 via the client device 802 can optionally include actuations of a hardware and/or virtual button of the client device 802. Moreover, the automated assistant client can include one or more local engines 806, such as an invocation engine that is operable to detect the presence of one or more spoken invocation phrases. The invocation engine can invoke the automated assistant 800 in response to detection of one of the spoken invocation phrases. For example, the invocation engine can invoke the automated assistant 800 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 802, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 800. As used herein, "invoking" the automated assistant 800 can include causing one or more previously inactive functions of the automated assistant 800 to be activated. For example, invoking the automated assistant 800 can include causing one or more local engines 806 and/or cloud-based automated assistant components 810 to further process audio data frames based on which the invocation phrase was detected, and/or one or more following audio data frames (whereas prior to invoking no further processing of audio data frames was occurring).

The one or more local engine(s) 806 of automated assistant 800 are optional, and can include, for example, the overall endpointing engine described above, a local voice-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 802 is relatively constrained in terms of computing resources (e.g., processor cycles, memory, battery, etc.), the local engines 806 may have limited functionality relative to any counterparts that are included in cloud-based automated assistant components 810.

Cloud-based automated assistant components 810 leverage the virtually limitless resources of the cloud to perform more robust and/or more accurate processing of audio data, and/or other user interface input, relative to any counterparts of the local engine(s) 806. Again, in various implementations, the client device 802 can provide audio data and/or other data to the cloud-based automated assistant components 810 in response to the invocation engine detecting a spoken invocation phrase, or detecting some other explicit invocation of the automated assistant 800.

The illustrated cloud-based automated assistant components 810 include a cloud-based TTS module 812, a cloud-based STT module 814, a natural language processor 816, a dialog state tracker 818, and a dialog manager 820. In some implementations, one or more of the engines and/or modules of automated assistant 800 may be omitted, combined, and/or implemented in a component that is separate from automated assistant 800. Further, in some implementations automated assistant 800 can include additional and/or alternative engines and/or modules. Cloud-based STT module 814 can convert audio data into text, which may then be provided to natural language processor 816.

Cloud-based TTS module 812 can convert textual data (e.g., natural language responses formulated by automated assistant 800) into computer-generated speech output. In some implementations, TTS module 812 may provide the computer-generated speech output to client device 802 to be output directly, e.g., using one or more speakers. In other implementations, textual data (e.g., natural language responses) generated by automated assistant 800 may be provided to one of the local engine(s) 806, which may then convert the textual data into computer-generated speech that is output locally.

Natural language processor 816 of automated assistant 800 processes free form natural language input and generates, based on the natural language input, annotated output for use by one or more other components of the automated assistant 800. For example, the natural language processor 816 can process natural language free-form input that is textual input that is a conversion, by STT module 814, of audio data provided by a user via client device 802. The generated annotated output may include one or more annotations of the natural language input and optionally one or more (e.g., all) of the terms of the natural language input.

In some implementations, the natural language processor 816 is configured to identify and annotate various types of grammatical information in natural language input. In some implementations, the natural language processor 816 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 816 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there." In some implementations, one or more components of the natural language processor 816 may rely on annotations from one or more other components of the natural language processor 816. In some implementations, in processing a particular natural language input, one or more components of the natural language processor 816 may use related prior input and/or other related data outside of the particular natural language input to determine one or more annotations.

In some implementations, dialog state tracker 818 may be configured to keep track of a "dialog state" that includes, for instance, a belief state of a one or more users' goals (or "intents") over the course of a human-to-computer dialog session and/or across multiple dialog sessions. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 820 may be configured to map a current dialog state, e.g., provided by dialog state tracker 818, to one or more "responsive actions" of a plurality of candidate responsive actions that are then performed by automated assistant 800. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 800 outputting additional natural language dialog. This responsive dialog may include, for instance, requests that the user provide parameters for some action (i.e., fill slots) that dialog state tracker 818 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), a command to a peripheral device (e.g., to turn off a light bulb), and so forth.

Figure 9:
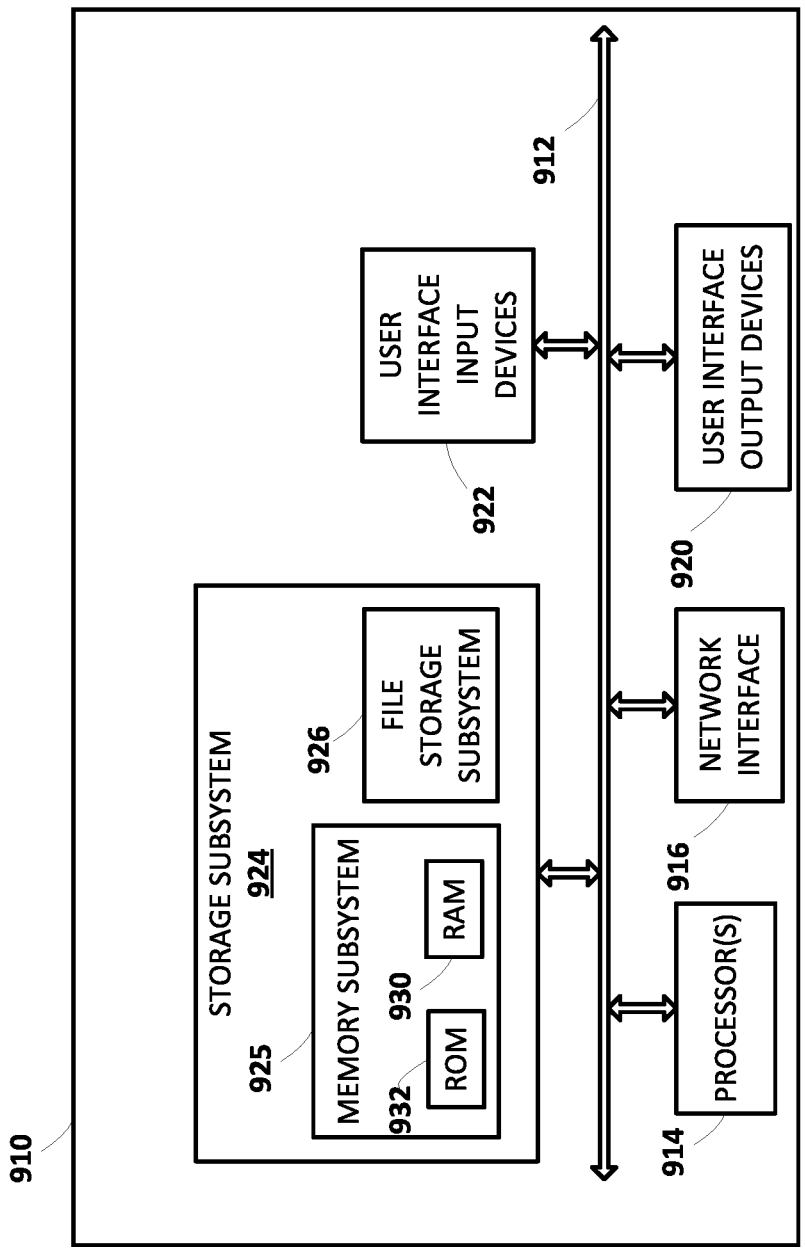
FIG. 9 illustrates an example architecture of a computing device.

FIG. 9 is a block diagram of an example computing device 910 that may optionally be utilized to perform one or more aspects of techniques described herein. In some implementations, one or more of a client computing device, and/or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of one or more of the processes of FIG. 4, FIG. 5, FIG. 6, and/or FIG. 7, as well as to implement various components depicted in FIG. 3 and/or FIG. 8.

These software modules are generally executed by processor 914 alone or in combination with other processors. Memory 925 used in the storage subsystem 924 can include a number of memories including a main random access memory ("RAM") 930 for storage of instructions and data during program execution and a read only memory ("ROM") 932 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, where the method includes processing an audio data stream, using an audio-based endpointer model, to generate an audio-based endpointing measure, wherein the audio data stream captures a spoken utterance of a user and is detected via one or more microphones of a client device. In some implementations, the method further includes processing a stream of accelerometer data, using an accelerometer model, to generate an accelerometer-based endpointing measure. In some implementations, the method further includes determining an overall endpointing measure as a function of both the audio-based endpointing measure and the accelerometer-based endpointing measure. In some implementations, the method further includes determining whether the overall endpointing measure satisfies a threshold. In some implementations, in response to determining the overall endpointing measure satisfies the threshold, the method further includes performing one or more actions based on the spoken utterance.

These and other implementations of the technology can include one or more of the following features.

In some implementations, prior to processing the stream of accelerometer data to generate the accelerometer-based endpointing measure, the method further includes determining whether the audio-based endpointing measure satisfies an initial threshold indicating a candidate endpoint in the audio data stream. In some versions of those implementations, processing the stream of accelerometer data, using the accelerometer model, to generate the accelerometer-based endpointing measure further includes processing the stream of accelerometer data in response to determining the audio-based endpointing measure satisfies the initial threshold indicating the candidate endpoint in the audio data stream.

In some implementations, the accelerometer-based endpointing measure classifies movement of the client device. In some versions of those implementations, processing the stream of accelerometer data, using the accelerometer model, to generate the accelerometer-based endpointing measure includes processing, using the accelerometer model, (i) a portion of the stream of accelerometer data captured prior to the user speaking the spoken utterance and (ii) a portion of the stream of accelerometer data captured subsequent to the user beginning to speak the spoken utterance, to generate the accelerometer-based endpointing measure.

In some implementations, determining the overall endpointing measure as a function of both the audio-based endpointing measure and the accelerometer-based endpointing measure includes boosting, based on the accelerometer-based endpointing measure, the likelihood the overall endpointing measure satisfies the threshold.

In some implementations, the accelerometer-based endpointing measure indicates no movement of the client device, and wherein determining the overall endpointing measure as a function of both the audio-based endpointing measure and the accelerometer-based endpointing measure includes decreasing, based on the accelerometer-based endpointing measure, the likelihood the overall endpointing measure satisfies the threshold.

In some implementations, the method further includes processing a stream of image data, using a gaze model, to generate a gaze-based endpointing measure that indicates whether the user is looking at the client device. In some versions of those implementations, determining the overall endpointing measure is further a function of the gaze-based endpointing measure.

In some implementations, performing the one or more actions based on the spoken utterance includes processing the spoken utterance using an automatic speech recognition model to generate a text representation of the spoken utterance.

In some implementations, performing the one or more actions based on the spoken utterance includes rendering content that is responsive to the spoken utterance.

In some implementations, the method further includes determining, prior to determining the overall endpointing measure satisfies the threshold, that the audio-based endpointing measure satisfies the threshold or an alternate threshold. In some implementations, the method further includes pre-fetching the content responsive to determining that the audio-based endpointing measure satisfies the threshold or the alternate threshold.

In some implementations, a method implemented by one or more processors is provided, the method includes processing an audio data stream, using an audio-based endpointer model, to generate an audio-based endpointing measure, wherein the audio data stream captures a spoken utterance of a user and is detected via one or more microphones of a client device. In some implementations, the method further includes processing a stream of image data, using a gaze model, to generate a gaze-based endpointing measure that indicates whether the user is looking at the client device. In some implementations, the method further includes determining an overall endpointing measure as a function of both the audio-based endpointing measure and the gaze-based endpointing measure. In some implementations, the method further includes determining whether the overall endpointing measure satisfies a threshold. In some implementations, in response to determining the overall endpointing measure satisfies the threshold, the method further includes performing one or more actions based on the spoken utterance.

These and other implementations of the technology can include one or more of the following features.

In some implementations, prior to processing the stream of image data to generate the gaze-based endpointing measure, the method further includes determining whether the audio-based endpointing measure satisfies an initial threshold indicating a candidate endpoint in the audio data stream. In some versions of those implementations, processing the stream of image data, using the gaze model, to generate the gaze-based endpointing measure further includes processing the stream of accelerometer data in response to determining the audio-based endpointing measure satisfies the initial threshold indicating the candidate endpoint in the audio data stream.

In some implementations, determining the overall endpointing measure as a function of both the audio-based endpointing measure and the gaze-based endpointing measure includes boosting, based on the gaze-based endpointing measure, the likelihood the overall endpointing measure satisfies the threshold.

In some implementations, the gaze-based endpointing measure indicates the user is not looking at the client device, and wherein determining the overall endpointing measure as a function of both the audio-based endpointing measure and the gaze-based endpointing measure includes decreasing, based on the gaze-based endpointing measure, the likelihood the overall endpointing measure satisfies the threshold.

In some implementations, the method further includes processing a stream of accelerometer data, using an accelerometer model, to generate an accelerometer-based endpointing measure. In some versions of those implementations, determining the overall endpointing measure is further a function of the accelerometer-based endpointing measure.

In some implementations, performing the one or more actions based on the spoken utterance includes processing the spoken utterance using an automatic speech recognition model to generate a text representation of the spoken utterance.

In some implementations, a method implemented by one or more processors is provided, the method includes determining a candidate endpoint using an audio-based endpointing measure, where the audio-based endpointing measure is generated by processing, using an audio model, an audio data stream capturing a spoken utterance of a user and is detected via one or more microphones of a client device. In some implementations, in response to determining the candidate endpoint, the method further includes prefetching content responsive to the spoken utterance. In some implementations, the method further includes determining whether an accelerometer-based endpointing measure and/or a gaze-based endpointing measure indicates the candidate endpoint is an endpoint. In some implementations, the accelerometer-based endpointing measure is generated by processing, using an accelerometer model, an accelerometer data stream. In some implementations, the gaze-based endpointing measure indicates whether the user is looking at the client device. In some implementations, the gaze-based endpointing is generated by processing, using a gaze model, an image data stream. In some implementations, in response to determining the candidate endpoint is the endpoint, rendering output based on the prefetched content responsive to the spoken utterance.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:
   processing an audio data stream, using an audio-based endpointer model, to generate an audio-based endpointing measure,
      wherein the audio data stream captures a spoken utterance of a user and is detected via one or more microphones of a client device;
   determining whether the audio-based endpointing measure satisfies an initial threshold indicating a candidate endpoint in the audio data stream, wherein the initial threshold, when satisfied, is indicative of a passage of a threshold duration of time since the user stopped speaking;
   in response to determining the audio-based endpointing measure satisfies the initial threshold:
      processing a stream of accelerometer data, using an accelerometer model, to generate an accelerometer-based endpointing measure;
      determining an overall endpointing measure as a function of both the audio-based endpointing measure and the accelerometer-based endpointing measure;
      determining whether the overall endpointing measure satisfies a threshold; and
      in response to determining the overall endpointing measure satisfies the threshold:
         performing one or more actions based on the spoken utterance.

2. The method of claim 1, wherein the accelerometer-based endpointing measure classifies movement of the client device.

3. The method of claim 2, wherein processing the stream of accelerometer data, using the accelerometer model, to generate the accelerometer-based endpointing measure comprises:
   processing, using the accelerometer model, (i) a portion of the stream of accelerometer data captured prior to the user speaking the spoken utterance and (ii) a portion of the stream of accelerometer data captured subsequent to the user beginning to speak the spoken utterance, to generate the accelerometer-based endpointing measure.

4. The method of claim 1, wherein determining the overall endpointing measure as a function of both the audio-based endpointing measure and the accelerometer-based endpointing measure comprises:
   boosting, based on the accelerometer-based endpointing measure, the likelihood the overall endpointing measure satisfies the threshold.

5. The method of claim 1, wherein the accelerometer-based endpointing measure indicates no movement of the client device, and wherein determining the overall endpointing measure as a function of both the audio-based endpointing measure and the accelerometer-based endpointing measure comprises:
   decreasing, based on the accelerometer-based endpointing measure, the likelihood the overall endpointing measure satisfies the threshold.

6. The method of claim 1, further comprising:
   processing a stream of image data, using a gaze model, to generate a gaze-based endpointing measure that indicates whether the user is looking at the client device.

7. The method of claim 6, wherein determining the overall endpointing measure is further a function of the gaze-based endpointing measure.

8. The method of claim 1, wherein performing the one or more actions based on the spoken utterance comprises:
   processing the spoken utterance using an automatic speech recognition model to generate a text representation of the spoken utterance.

9. The method of claim 1, wherein performing the one or more actions based on the spoken utterance comprises:
   rendering content that is responsive to the spoken utterance.

10. The method of claim 9, further comprising:
    determining, prior to determining the overall endpointing measure satisfies the threshold, that the audio-based endpointing measure satisfies the threshold or an alternate threshold; and
    pre-fetching the content responsive to determining that the audio-based endpointing measure satisfies the threshold or the alternate threshold.

11. A method implemented by one or more processors, the method comprising:
- processing an audio data stream, using an audio-based endpointer model, to generate an audio-based endpointing measure,
    - wherein the audio data stream captures a spoken utterance of a user and is detected via one or more microphones of a client device;
- determining whether the audio-based endpointing measure satisfies an initial threshold indicating a candidate endpoint in the audio data stream, wherein the initial threshold, when satisfied, is indicative of a passage of a threshold duration of time since the user stopped speaking;
- in response to determining the audio-based endpointing measure satisfies the initial threshold:
    - processing a stream of image data, using a gaze model, to generate a gaze-based endpointing measure that indicates whether the user is looking at the client device;
    - determining an overall endpointing measure as a function of both the audio-based endpointing measure and the gaze-based endpointing measure; determining whether the overall endpointing measure satisfies a threshold; and
- in response to determining the overall endpointing measure satisfies the threshold:
    - performing one or more actions based on the spoken utterance.

12. The method of claim 11, wherein determining the overall endpointing measure as a function of both the audio-based endpointing measure and the gaze-based endpointing measure comprises:
- boosting, based on the gaze-based endpointing measure, the likelihood the overall endpointing measure satisfies the threshold.

13. The method of claim 11, wherein the gaze-based endpointing measure indicates the user is not looking at the client device, and wherein determining the overall endpointing measure as a function of both the audio-based endpointing measure and the gaze-based endpointing measure comprises:
- decreasing, based on the gaze-based endpointing measure, the likelihood the overall endpointing measure satisfies the threshold.

14. The method of claim 11, further comprising:
- processing a stream of accelerometer data, using an accelerometer model, to generate an accelerometer-based endpointing measure.

15. The method of claim 14, wherein determining the overall endpointing measure is further a function of the accelerometer-based endpointing measure.

16. The method of claim 11, wherein performing the one or more actions based on the spoken utterance comprises:
- processing the spoken utterance using an automatic speech recognition model to generate a text representation of the spoken utterance.

* * * * *